United States Patent
Cochran et al.

(10) Patent No.: US 10,752,711 B2
(45) Date of Patent: *Aug. 25, 2020

(54) THERMOPLASTIC ELASTOMERS VIA REVERSIBLE ADDITION-FRAGMENTATION CHAIN TRANSFER POLYMERIZATION OF TRIGLYCERIDES

(71) Applicant: Iowa State University Research Foundation, Inc., Ames, IA (US)

(72) Inventors: Eric W. Cochran, Ames, IA (US); Ronald Christopher Williams, Ames, IA (US); Nacu Hernandez, Ames, IA (US); Andrew Cascione, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,818

(22) Filed: Jun. 27, 2018

(65) Prior Publication Data

US 2018/0305478 A1 Oct. 25, 2018

Related U.S. Application Data

(60) Continuation of application No. 15/895,888, filed on Feb. 13, 2018, now Pat. No. 10,093,758, which is a division of application No. 15/487,570, filed on Apr. 14, 2017, now Pat. No. 9,926,392, which is a division of application No. 14/282,737, filed on May 20, 2014, now Pat. No. 9,650,463.

(60) Provisional application No. 61/825,241, filed on May 20, 2013.

(51) Int. Cl.
| | |
|---|---|
| C08L 95/00 | (2006.01) |
| C08F 122/20 | (2006.01) |
| C08F 293/00 | (2006.01) |
| C09J 153/00 | (2006.01) |
| C08F 242/00 | (2006.01) |
| C09J 135/06 | (2006.01) |
| C08L 35/06 | (2006.01) |
| C08L 53/00 | (2006.01) |
| C08F 8/04 | (2006.01) |
| C08F 222/10 | (2006.01) |

(52) U.S. Cl.
CPC .............. *C08F 122/20* (2013.01); *C08F 8/04* (2013.01); *C08F 242/00* (2013.01); *C08F 293/00* (2013.01); *C08F 293/005* (2013.01); *C08L 35/06* (2013.01); *C08L 53/00* (2013.01); *C08L 95/00* (2013.01); *C09J 135/06* (2013.01); *C09J 153/00* (2013.01); *C08F 222/103* (2020.02); *C08F 2438/03* (2013.01); *C08L 2555/80* (2013.01); *C08L 2555/82* (2013.01)

(58) Field of Classification Search
CPC .......................... C08F 242/00; C08F 2438/03
See application file for complete search history.

(56) References Cited

U.S. PATENT DOCUMENTS

| | | | |
|---|---|---|---|
| 2,190,906 | A | 2/1940 | Stoesser et al. |
| 2,192,090 | A | 2/1940 | Stoesser et al. |
| 3,499,857 | A | 3/1970 | Searight et al. |
| 5,763,548 | A | 6/1998 | Matyjaszewski et al. |
| 5,932,675 | A | 8/1999 | Rizzardo et al. |
| 6,184,289 | B1 | 2/2001 | Teranishi et al. |
| 6,197,905 | B1 | 3/2001 | Rizzardo et al. |
| 6,235,857 | B1 | 5/2001 | Rizzardo et al. |
| 6,512,081 | B1 | 1/2003 | Rizzardo et al. |
| 6,538,091 | B1 | 3/2003 | Matyjaszewski et al. |
| 6,642,318 | B1 | 11/2003 | Chiefari et al. |
| 7,205,362 | B2 | 4/2007 | Favier et al. |
| 7,714,075 | B1 | 5/2010 | Le et al. |

(Continued)

FOREIGN PATENT DOCUMENTS

| | | |
|---|---|---|
| CL | 200101275 | 5/2002 |
| CL | 2014001890 A | 1/2015 |

(Continued)

OTHER PUBLICATIONS

Eren et al Journal of Applied Polymer Science, vol. 97, 2264-2272 (Year: 2005).*

(Continued)

*Primary Examiner* — Mark S Kaucher
(74) *Attorney, Agent, or Firm* — Troutman Pepper Hamilton Sanders LLP (Rochester)

(57) ABSTRACT

The present invention relates to a thermoplastic block copolymer comprising at least one PA block and at least one PB block. The PA block represents a polymer block comprising one or more units of monomer A, and the PB block represents a polymer block comprising one or more units of monomer B. Monomer A is a vinyl, acrylic, diolefin, nitrile, dinitrile, acrylonitrile monomer, a monomer with reactive functionality, or a crosslinking monomer. Monomer B is a radically polymerizable triglyceride or mixtures thereof, typically in the form of a plant or animal oil. The present invention also relates to a method of preparing a thermoplastic block copolymer or novel thermoplastic statistical copolymers by polymerizing a radically polymerizable monomer with a radically polymerizable triglyceride or mixtures thereof via reversible addition-fragmentation chain-transfer polymerization (RAFT), in the presence of an free radical initiator and a chain transfer agent.

27 Claims, 15 Drawing Sheets

(56) References Cited

U.S. PATENT DOCUMENTS

| | | | |
|---|---|---|---|
| 9,650,463 | B2 | 5/2017 | Cochran et al. |
| 2002/0095007 | A1 | 7/2002 | Larock et al. |
| 2003/0088007 | A1 | 5/2003 | Wool et al. |
| 2003/0212168 | A1 | 11/2003 | White et al. |
| 2006/0252901 | A1 | 11/2006 | Narayan et al. |
| 2008/0153982 | A1 | 6/2008 | Lai et al. |
| 2008/0208071 | A1 | 11/2008 | Ionescu et al. |
| 2008/0281071 | A1 | 11/2008 | Ionescu et al. |
| 2011/0302825 | A1 | 12/2011 | Bloom |
| 2012/0316309 | A1 | 12/2012 | Chisholm et al. |
| 2013/0142996 | A1 | 6/2013 | Poncelet et al. |
| 2013/0145957 | A1 | 6/2013 | Shchukin et al. |
| 2013/0184383 | A1 | 7/2013 | Cochran et al. |
| 2014/0343192 | A1 | 11/2014 | Cochran et al. |

FOREIGN PATENT DOCUMENTS

| | | |
|---|---|---|
| CN | 101225141 A | 7/2008 |
| CN | 101230020 A | 7/2008 |
| CN | 101563377 A | 10/2009 |
| CN | 102203149 A | 9/2011 |
| CN | 102295718 A | 12/2011 |
| EP | 1384729 A1 | 1/2004 |
| EP | 2430096 A1 | 6/2015 |
| ES | 2108646 B1 | 12/1997 |
| FR | 2670497 | 6/1992 |
| IL | 172766 B | 3/2011 |
| JP | S33-003732 | 5/1958 |
| JP | S57-165460 A | 10/1982 |
| JP | H01-129097 A | 5/1989 |
| JP | 2002-528609 A | 9/2002 |
| JP | 2003-012719 A | 1/2003 |
| JP | 2003-504437 A | 2/2003 |
| JP | 2009-529081 | 8/2009 |
| JP | 2012-514117 A | 6/2012 |
| WO | WO 1992/13903 A1 | 8/1992 |
| WO | WO 1994/22957 | 10/1994 |
| WO | WO 1999/05099 A1 | 2/1999 |
| WO | WO 1999/021900 A1 | 5/1999 |
| WO | WO 1999/31144 A1 | 6/1999 |
| WO | WO 2001059008 A1 | 8/2001 |
| WO | WO 2005/000923 A1 | 1/2005 |
| WO | WO 2005/000924 A1 | 1/2005 |
| WO | WO 2005/113612 A1 | 12/2005 |
| WO | WO 2007/100719 A1 | 9/2007 |
| WO | WO 2007/101909 A1 | 9/2007 |
| WO | WO 2009/105688 A1 | 9/2009 |
| WO | WO 2010/078320 | 7/2010 |
| WO | WO 2013/003887 A1 | 1/2013 |
| WO | WO 2013/109878 A1 | 7/2013 |

OTHER PUBLICATIONS

Office Action in India Patent Application No. 5488/CHENP/2014, based on PCT/US2013/022131, dated May 16, 2019.
Office Action in European Patent Application No. 13738906.0, based on PCT/US2013/022131, dated Oct. 8, 2018.
Office Action in Indonesian Patent Application No. P-00201404758, based on PCT/US2013/022131, dated Nov. 2, 2018.
Office Action in Korean Patent Application No. 10-2014-7022520, based on PCT/US2013/022131, dated Nov. 16, 2018.
Office Action in Thailand Application No. 1501006934, based on PCT/US2014/038799, dated Jun. 18, 2018.
Alemdar et al., "Production of Oil-Based Binder by RAFT Polymerization Technique", Progress in Organic Coatings, 69(4):552-526 (2010).
Alemdar et al., "Styrenation of Triglyceride Oil by Nitroxide Mediated Radical Polymerization," Progress in Organic Coatings 66:99-106 (2009).
Alli et al., "Poly(N-isopropylacrylamide) thermoresponsive cross-linked conjugates containing polymeric soybean oil and/or polypropylene glycol", European Polymer Journal 44: 1701-1713 (2008).
Bonnaillie et al., "Thermosetting Foam with a High Bio-Based Content from Acrylated Epoxidized Soybean Oil and Carbon Dioxide," J. Appl. Polym. Sci. 105: 1042-52 (2007).
Cakmakli et al., "Synthesis and Characterization of Polymeric Linseed Oil Grafted Methyl Methacrylate or Styrene", Macromol. Biosci., 4: 649-655 (2004).
Can et al., "Rigid, Thermosetting Liquid Molding Resins From Renewable Resources. I. Synthesis and Polymerization of Soy Oil Monoglyceride Maleates," Journal of Applied Polymer Science 81:69-77 (2001).
Cascione et al., "Development of Biopolymers from Soybean Oil," Presentation at the Petersen Asphalt Conference, Laramie, WY (Oct. 10, 2012).
Cascione et al., "Investigation of Bitumen Modified with Biopolymers Derived from Soybean Oil," Presented at the 5th European Asphalt Technology Association (EATA) Conference, Braunschweig, Germany (Jun. 3-5, 2013).
Cochran et al., "Kumho Pre-Poposal for Development of a Bitumen Modifier from Thermoplastic Elastomers Produced with Soybean Oil Feedstock" (Jan. 19, 2011).
Cochran et al., "Development of Oil-Based Styrenic Block Copolymers via Atom Transfer Radical Polymerization for Bitumen Modification," White paper to DuPont (May 2011).
Cochran et al., "Development of Soybean Oil-Based Styrenic Block Copolymers via Atom Transfer Radical Polymerization for Bitumen Modification," A Grant Proposal to Kumho Petrochemical Initiative, submitted Jan. 19, 2011.
Cochran et al., "Development of Bio Based Polymers for Use in Asphalt," White paper to DOT (Mar. 7, 2011).
Cochran et al., "Thermoplastic Elastomers for Bitumen Modifications from Soybean Oil-Based Styrenic Block Copolymers," Presentation to DuPont (Jun. 21, 2011).
Compendium of Chemical Terminology Gold Book, published by the International Union of Pure and Applied Chemical Chemistry (version 2.3.2, Aug. 19, 2012), pp. 322-323.
Demirbas, "Mechanisms of Liquefaction and Pyrolysis Reactions of Biomass," Energy Conversion & Management 41:633-646 (2000).
Dong et al., "Synthesis of Hyperbranched Polymers with Pendent Norbornene Functionalities via RAFT Polymerization of a Novel Asymmetrical Divinyl Monomer," Macromolecules 42(13):4596-5603 (2009).
Dong et al., "Branched Polystyrene with Abundant Pendant Vinyl Functional Groups from Asymmetric Divinyl Monomer," J. Polym. Sci., Part A: Polym. Chem. 46(18):6023-6034 (2008).
Dziczkowski et al., "Route to Co-Acrylic Modified Alkyd Resins Via a Controlled Polymerization Technique", Progress in Organic Coatings, 73(4):355-365 (2012).
Extended European Search Report and European Search Opinion in European National Application No. 13738906.0 based on PCT/US2013/02131 (dated Jun. 25, 2015).
Final Examination Report in Singapore Application No. 11201404228U (dated Jun. 28, 2016).
Fokou et al., "Acyclic Triene Metathesis Polymerization with Chain-Stoppers: Molecular Weight Control in the Synthesis of Branched Polymers," Macromol. Rapid Commun. 29:1620-25 (2008).
Funke et al., "Microgels—Intramolecularly Crosslinked Macromolecules with a Globular Structure," Advances in Polymer Science. 136:142-227 (1998).
Gao et al., "Gelation in ATRP Using Structurally Different Branching Reagents: Comparison of Inimer, Divinyl and Trivinyl Cross-Linkers," Macromolecules 42: 8039-43 (2009).
Gao et al., "Polymers from Triglyceride Oils II. Vinyl Polymers and Some Other Composites or Hybrid Materials," Guangzhou Chemistry, 35(4): 61-71 (2010). Abstract in English.
Gultekin et. al., "Styrenation of Castor Oil and Linseed Oil by Macromer Method," Macromol. Mater. Eng. 283:15-20 (2000).
Harrison et al., "Peroxide Catalyzed Polymerization of Styrene in Pure Fatty Methyl Esters," The Journal of the American Oil Chemists' Society 114-117 (1953).
Henna et al., "Biobased Thermoset From the Free-Radical Copolymerization of Conjugated Linseed Oil," Journal of Applied Polymer Science 104:979-985 (2007).

(56) References Cited

OTHER PUBLICATIONS

Hernandez, "Thermoplastic Elastomeric Block Copolymers Via Controlled Radical Polymerization of Soybean Oil," Abstract on ACS website (Aug. 21, 2012).
Hernandez et al., "Thermoplastic Elastomeric Block Copolymers Via Controlled Radical Polymerization of Soybean Oil," Presentation at the American Chemical Society Meeting, Philadelphia, PA (Aug. 21, 2012).
Hernandez-Cantu, "Sustainability Through Blockcopolymers—Novel Ion Exchange Cathode Membranes and Soybean Oil Based Thermoplastic Elastomers," Thesis, Iowa State University, Ames, IA (submitted Nov. 15, 2012).
Hernandez-Cantu, "Sustanability Through Blockcopolymers—Fuel Cells' Cathode Membranes and Soybean Oil Based Thermoplastic Elastomers," Thesis Defense Presentation, Ames, IA (Nov. 2012).
Hsu et al. "Free-Radical Crosslinking Copolymerization of Styrene/Unsaturated Polyester Resins: 1. Phase Separation and Microgel Formation", Polymer, 34(21): 4496-1505 (1993).
International Preliminary Report on Patentability, dated Jul. 31, 2014, for PCT/US2013/022131.
International Search Report and the Written Opinion of the International Search Authority for PCT/US2014/038799, dated Jan. 29, 2015.
International Search Report and the Written Opinion of the International Searching Authority, or the Declaration, dated May 7, 2013, for PCT/US2013/022131.
International Preliminary Report on Patentability for PCT/US2014/038799, dated Oct. 2, 2015.
Khot et al., "Development and Application of Triglyceride-based Polymers and Composites," J. Appl. Polym. Sci. 82: 703-23 (2001).
Landin et al., "Rheological Changes During the Copolymerization of Vinyl and Divinyl Monomers", ACS Symposium Series, 243(3): 33-46 (1984).
Lebreton et al., "Use of Original ω-Perfluorinated Dithioesters for the Synthesis of Well-Controlled Polymers by Reversible Addition-Fragmentation Chain Transfer (RAFT)," Macro. Chem. Phys. 203(3):522-37 (2002).
Lin et al., "Reversible Addition-Fragmentation Chain Transfer Mediated Radical Polymerization of Asymmetrical Divinyl Monomers Target Hyperbranched Vinyl Polymers," J. Polym. Sci. 45: 26-40 (2006).
Lu et al., "Novel Polymeric Materials from Vegetable Oils and Vinyl Monomers: Preparation, Properties, and Applications," ChemSusChem 2:136-147 (2009).
Masaki et al., "Kinetic Study of the Crosslinking Reaction of 1,2-Polybutadiene with Dicumyl Peroxide in the Absence and Presence of Vinyl Acetate," J. Polym. Sci., Part A: Polym. Chem. 42(17):4437-47 (2004).
Matsumoto et al., "Approach to Ideal Network Formation Governed by Flory-Stockmayer Gelation Theory in Free-Radical Cross-Linking Copolymerization of Styrene with m-Divinylbenzene," Macromolecules, 32:8336-39 (1999).
McCleery, "Goodyear Researchers Try Soybean Oil as Tire Ingredient," IndyStar Online Edition Business Section (Jul. 25, 2012).
Meier et al., "Plant Oil Renewable Resources as Green Alternatives in Polymer Science," Chem. Soc. Rev. 36:1788-1802 (2007).
Moad et al., "Living Radical Polymerization by the RAFT Process" Aust. J. Chem. 58:379-410 (2005).
Moad et al., "Living Radical Polymerization by the RAFT Process—A First Update," Aust. J. Chem. 59:669-692 (2006).
Moad et al., "Living Radical Polymerization by the RAFT Process—A Second Update," Aust. J. Chem. 62:1402-1472 (2009).
Moad et al., "Living Radical Polymerization by the RAFT Process—A Third Update," Aust. J. Chem. 65: 985-1076 (2012).
MOAD, "RAFT (Reversible Addition-Fragmentation Chain Transfer) Crosslinking (Co)Polymerization of Multi-Olefinic Monomers to Form Polymer Networks," Polym. Int. 64: 15-24 (2014).
"Modern Styrenic Polymers: Polysterenes and Styrenic Copolymers," Scheirs, eds. John Wiley & Sons, Ltd (2003) ("Handbook").
Office Action dated Jul. 20, 2017 in Australian National Application No. 2014268692, based on PCT/US2014/038799.
Pure and Applied Chem., 66(5)1155-1156.
Written opinion in Canada National Application App. No. 2,860,861, based on PCT/US2013/022131 dated Dec. 15, 2017.
Office Action dated Apr. 5, 2017, in Chilean National Application No. 201503375, based on PCT/US2014/038799.
Office Action dated Aug. 23, 2017 in Chilean National Application No. 201503375, based on PCT/US2014/038799. English Translation also provided.
Office Action dated Sep. 5, 2017 in Chilean National Application No. 1890-2014, based on PCT/US2013/022131. English Translation also provided.
First Office Action and Search Report in Chinese National Application No. 201380009567.9 based on PCT/US2013/02131 (dated Nov. 5, 2015).
Second Office Action and Supplemental Search Report in Chinese National Application No. 201380009567.9 based on PCT/US2013/02131 (dated Jun. 8, 2016).
Third Office Action and Supplemental Search Report in Chinese National Application No. 201380009567.9 based on PCT/US2013/02131 (dated Nov. 15, 2016).
Fourth Office Action dated Jul. 12, 2017 in Chinese National Application No. 201380009567.9, based on PCT/US2013/022131. English Translation also provided.
Office Action dated Jan. 19, 2018 in Chinese National Application No. 201480029039.4 based on PCT/US2014/038799.
Office Action dated Apr. 12, 2017 in Chinese National Application No. 201480029039.4, based on PCT/US2014/038799. English translation also provided.
Office Action in Eurasia National Application No. 201491384, based on PCT/US2013/02131, dated May 31, 2017. English translation also provided.
Office Action in Eurasia National Application No. 201491384 based on PCT/US2013/022131 (dated Jan. 28, 2016).
Office Action in Eurasia National Application No. 201491384 based on PCT/US2013/022131 (dated Oct. 4, 2016).
Office Action dated Feb. 27, 2017, in Eurasian National Application No. 201592176, based on PCT/US2014/038799. English Translation also provided.
Office Action dated Nov. 24, 2017 in Eurasian National Application No. 201592176, based on PCT/US2014/038799. English Translation also provided.
Office Action dated Jul. 26, 2017 in European National Application No. 14732720.9, based on PCT/US2014/038799.
Office Action dated Mar. 19, 2017, in Israel National Application No. 233491, based on PCT/US2013/022131. English Translation also provided.
Notice of Reasons for Rejection in Japanese Patent Application No. 2014-553449 (dated Dec. 7, 2016).
Notice of Reasons for Rejection in Japanese Application No. 2014-553449, based on PCT/US2013/022131 (dated Aug. 28, 2017) English Translation also provided.
Office Action dated Sep. 15, 2017 in Malaysia National Application No. PI2014002118, based on PCT/US2013/022131. English Translation provided.
Office Action in Mexico National Application No. MX/a/2014/008636 corresponding to PCT/2013/022131.
Search Report and Written Opinion for Singapore Patent Application No. 11201404228U dated Dec. 10, 2015.
Office Action dated Sep. 12, 2017 in Singapore National Application No. 10201606742U, based on PCT/US2014/038799.
Written opinion in Singapore National Application App. No. 10201606740Q based on PCT/US2014/038799 dated Nov. 30, 2017.
Office Action in U.S. Appl. No. 13/744,733 (dated Mar. 17, 2015).
Office Action in U.S. Appl. No. 13/744,733 (dated Aug. 25, 2015).
Office Action in U.S. Appl. No. 13/744,733 (dated Apr. 20, 2016).
Office Action in U.S. Appl. No. 13/744,733 (dated Oct. 14, 2016).
Office Action in U.S. Appl. No. 14/282,737 (dated Nov. 23, 2015).
Office Action in U.S. Appl. No. 14/282,737 (dated Feb. 5, 2016).
Office Action in U.S. Appl. No. 14/282,737 (dated Jul. 15, 2016).
Office Action in U.S. Appl. No. 13/744,733 (dated Jun. 8, 2017).

(56) References Cited

OTHER PUBLICATIONS

Polanowski et al., "Modeling of Branching and Gelation in Living Copolymerization of Monomer and Divinyl Cross-Linger Using Dynamic Lattice Liquid Model (DLL) and Flory-Stockmayer Model," Polymer 51(25):6084-92 (2010).
Pradel et al., "Controlled Radical Polymerization of 1,3-Butadiene. II. Initiation by Hydrogen Peroxide and reversible Termination by TEMPO," J. Polym. Sci., Part A: Polym. Chem. 38(18):3293-3302 (2000).
Robertson et al., "Sustainable thermoplastic elastomers derived from vegetable oils," Abstract for the Presentation at 245th ACS National Meeting and Exposition, Apr. 10, 2013, New Orleans, Louisiana.
Saithai et al., "Synthesis and Characterization of Triglyceride-based Copolymer from Soybean Oil", Materials Science Forum, 695:320-323 (2011).
Skey et al., "Facile One Pot Synthesis of a Range of Reversible Addition-Fragmentation Chain Transfer (RAFT) Agents", Chem Comm., 4183-4185 (2008).
Sun et al., "Microgel Formation in the Free Radical Cross-Linking Copolymerization of Methyl Methacrylate (MMA) and Ethylene Glycol Dimethacrylate (EGDMA)", Ind. Eng. Chem. Res. 36:1343-1351 (1997).
Vo et al., "RAFT Synthesis of Branched Acrylic Copolymers," Macromolecules 40: 7119-25 (2007).
Wang et al., "Branching and Gelation in Atom Transfer Radical Polymerization of Methyl Methacrylate and Ethylene Glycol Dimethacrylate," Polym. Eng. Sci. 45: 720-27 (2005).
Wang et al., "Sustainable Thermoplastic Elastomers Derived from Fatty Acids", Macromolecules, 46(18):7207-7212 (2013).
Wei et al., "Ab initio RAFT Emulsion Polymerization of Butadiene Using the Amphiphilic Poly(acrylic acid-b-styrene) Trithiocarbonate as Both Surfactant and Mediator," J. Polym. Sci. 49:2980-89 (2011).
Wei et al., "Synthesis of Structured Nanoparticles of Styrene/Butadiene Block Copolymers via RAFT Seeded Emulsion Polymerization," Polym. 51:3879-86 (2010).
Wei et al., "Styrene-Butadiene-Styrene Triblock Copolymer Latex via Reversible Addition-Fragmentation Chain Transfer Miniemulsion Polymerization," Ind. Eng. Chem. Res. 51:15530-35 (2012).
Wikipedia, "Molar Mass Distribution;" accessed Dec. 18, 2015.
Williams et al., "Development of Bio Based Polymers for Use in Asphalt", a white paper to Iowa Department of Transportation (Mar. 7, 2011).
Williams et al., "Development of Bio-Based Polymers for Use in Asphalt", InTrans Project Reports, Iowa State University, Institute for Transportation, 1-34 (Feb. 2014).
Xia et al., "Vegetable Oil-Based Polymeric Materials: Synthesis, Properties, and Applications," Green Chem. 12:1893-1909 (2010).
Yan et al., "Gel Point Suppression in RAFT Polymerization of Pure Acrylic Cross-Linker Derived from Soybean Oil," Biomacromolecules 17(8):2701-9 (2016).
Young et al., "Radical Polymerization," Introduction to Polymers, Boca Raton, FL: CRC, 2011. 117-18. eBook PDF.
Yu et al., "Reaction Behavior and Network Development in RAFT Radical Polymerization of Dimethacrylates," Macromol. Chem. Phys. 209: 551-56 (2008).
Yu et al., "Comparison of Reaction Kinetics and Gelation Behaviors in Atom Transfer, Reversible Addition-Fragmentation Chain Transfer and Conventional Free Radical Copolymerization of Oligo(ethylene glycol) Methyl Ether Methacrylate and Oligo(ethylene glycol) Dimethacrylate" Polymer 50: 3488-94 (2009).
Yu et al., "Interfacially Confined RAFT Miniemulsion Copolymerization of Styrene and Butadiene," J. Appl. Polym. Sci. 127:2557-65 (2013).

Office Action in Japanese Application No. 2016-515021, dated Mar. 19, 2018 based on PCT/US2014/038799.
Extended European Search Report for European Patent Application No. 18150507.4 dated May 5, 2018.
Office Action in U.S. Appl. No. 15/896,151, dated Jun. 11, 2019.
Office Action in Malaysian Patent Application No. PI 2017001677, based on PCT/US2013/022131, dated Jun. 29, 2019.
Office Action in U.S. Appl. No. 16/123,601, dated Aug. 9, 2019.
Black et al. "Chain Transfer of Vegetable Oil Macromonomers in Acrylic Solution Copolymerization," Journal of Applied Polymer Science 120:1390-1396 (2011).
Heimenz "Networks, Gels, and Rubber Elasticity," Polymer Chemistry 2nd Ed., Boca Raton, FL: CRC Press, pp. 410-414 (2007).
Wikipedia, "Compression molding" (Accessed: Sep. 10, 2019).
Rosato "Compression Molding," Plastic Product Material and Process Selection Handbook, New York, New York; Elsevier, pp. 439-454 (2004).
Capelot et al., "Catalytic Control of the Vitrimer Glass Transition," ACS Macro Lett. 1:789-792 (2012).
Montarnal et al., "Silica-Like Malleable Materials from Permanent Organic Networks," Science 334:965-968 (2011).
Office Action in India Application No. 7116/CHENP/2015, based on PCT/US2014/038799, dated Nov. 15, 2019.
Bening et. al, "Styrenic Block Copolymer Elastomers," in Scheirs eds., Modern Styrenic Polymers: Polystyrenes and Styrenic Copolymers John Wiley & Sons (2003).
Preliminary Office Action in Brazil Application No. 112014017476-8, based on PCT/US2013/022131, dated Nov. 12, 2019 (with English translation).
Office Action in U.S. Appl. No. 16/123,601, dated Nov. 15, 2019.
Odian, "Molecular Weight", Principles of Polymerization, 4th Ed. Hoboken, NJ: Wiley-Interscience, (2004).
Fernendes et al., "Environmentally-Friendly Alternatives for Epoxy Resin Composites Based on Waste Valorization" SAMPE Europe Conference, Southhampton (2018).
Grant ed., Hackh's Chemical Dictionary, 4th Ed., New York: McGraw-Hill, p. 527 (1969).
Office Action in Indonesia Application No. P-00201508192, based on PCT/US2014/038799, dated Jul. 11, 2019.
Preliminary Office Action in Brazil Application No. 112015028368-3, based on PCT/US2014/038799, dated Dec. 12, 2019 (with English translation).
Office Action in Chinese Application No. 201810473397.4 based on PCT/US2014/038799, dated Jan. 3, 2020.
Alemdar et al., "Styrenated Sunflower Oil Polymers from RAFT Process for Coating Application" Journal of Applied Polymer Science 125(1):10-18(2012).
Office Action in Chinese Application No. 201810473937.9 based on PCT/US2014/038799, dated Jan. 3, 2020.
Preliminary Office Action in Brazil Application No. 122017010545-0, based on PCT/US2014/038799, dated Feb. 6, 2020 (with English translation).
Hiemenz and Lodge "Chain-Growth Polymerization," Polymer Chemistry, 2nd Ed. CRC Press, pp. 77-110 (2007).
Odian "Radical Chain Polymerization," Principles of Polymerization, 4th Ed., Hoboken, New Jersey:John Whiley and Sons, Inc., pp. 328-329 (2004).
Laible "Allyl Polymerization," Chem. Rev. 58(5): 807-843 (1958).
Extended European Search Report and European Search Opinion in European National Application No. 19208355.8 based on PCT/US2014/038799, dated Feb. 26, 2020.
Office Action in Chinese Application No. 201810473383.2 based on PCT/US2013/022131, dated Mar. 13, 2020 (English translation).
Office Action in Chinese Application No. 201810474450.2 based on PCT/US2013/022131, dated Mar. 19, 2020 (English translation).

\* cited by examiner

*INITIATION*
*REVERSIBLE CHAIN TRANSFER/PROPAGATION*
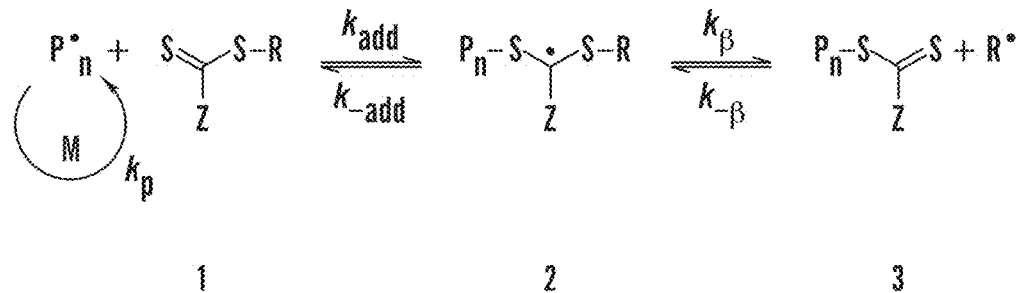
*REINITIATION*
*CHAIN EQUILIBRIUM/PROPAGATION*
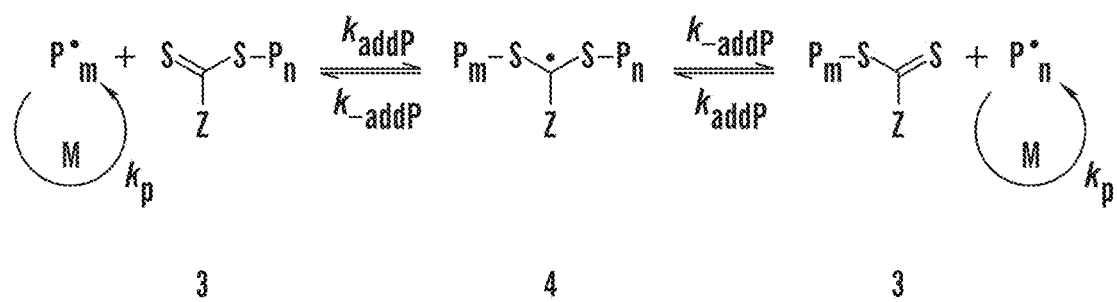
*TERMINATION*
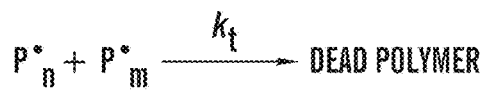
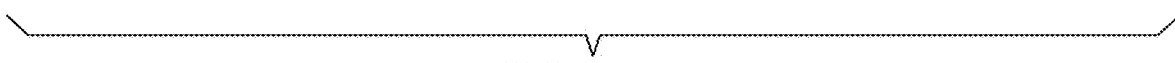

THERMOPLASTIC ELASTOMERS VIA REVERSIBLE ADDITION-FRAGMENTATION CHAIN TRANSFER POLYMERIZATION OF TRIGLYCERIDES

This application is a continuation of U.S. patent application Ser. No. 15/895,888, filed Feb. 13, 2018, which is a divisional application of U.S. patent application Ser. No. 15/487,570, filed Apr. 14, 2017, now U.S. Pat. No. 9,926,392, issued Mar. 27, 2018, which is a divisional application of U.S. patent application Ser. No. 14/282,737, filed May 20, 2014, now U.S. Pat. No. 9,650,463, issued May 16, 2017, which claims the priority benefit of U.S. Provisional Patent Application Ser. No. 61/825,241, filed May 20, 2013, all of which are hereby incorporated by reference in their entirety.

FIELD OF THE INVENTION

The present invention relates to a novel thermoplastic elastomer composition and methods of making and using them in various applications. In particular, the present invention relates to successful application of reversible addition-fragmentation chain transfer polymerization (RAFT) for making novel thermoplastic homopolymers, thermoplastic elastomeric block copolymers, and thermoplastic elastomeric statistical copolymers. These polymers are derived from at least one radically polymerizable triglyceride or mixture of triglycerides, typically in the form of a plant oil, animal oil, or synthetic triglycerides. The thermoplastic copolymers additionally include at least one radically polymerizable monomer.

BACKGROUND OF THE INVENTION

Styrenic block copolymers (SBCs), most notably those of DuPont's Kraton® family, such as styrene-butadiene type polymers (e.g., styrene-butadiene di-block, SB; styrene-butadiene-styrene tri-block, SBS), have historically served the asphalt and footwear industries for years, with markets also in the industries of packaging, pressure sensitive adhesives, packaging materials, etc. Of these markets, the use of SBSs as bitumen modifiers is one of the largest and the most forgiving in terms of material properties.

The global asphalt market is to reach 118.4 million metric tons by 2015, according to a January 2011 report by Global Industry Analysts, Inc. The asphalt paving industry accounts for the largest end-use market segment of asphalt. With increasing growth in the developing markets of China, India, and Eastern Europe, asphalt will be increasingly needed to construct roadway infrastructure for the next decade. The increased demand for asphalt, along with the need for improved asphalt materials/pavement performance, creates the opportunity for an asphalt modifier.

The grade of the asphalt governs the performance of paving mixtures at in-service temperatures. In many cases, the characteristics of bitumen needs to be altered to improve its elastic recovery/ductility at low temperatures for sufficient cracking resistance as well as to increase its shearing resistance for sustained loads and/or at high temperatures for rutting resistance. The physical properties of bitumen are typically modified with the addition of SBS polymers to produce an improved asphalt grade that enhances the performance of asphalt paving mixtures. Of the asphalt mixtures that are polymer modified, approximately 80% of polymer modified asphalt uses SBS-type polymers.

Over the past few years, the price of butadiene, the principal component of SBC polymers used for bitumen modification, has increased dramatically. In 2008, there was a shortage of SBS polymers for the asphalt industry. With the forecast of increasing demand of liquid asphalt for the next decade, there remains a strong need for a new type of cost-effective, environment-friendly, viable polymers that can be used as an asphalt modifier in lieu of standard styrene-butadiene type modifiers.

Vegetable oils have been considered as monomeric feedstocks for the plastics industry for over 20 years. Polymers from vegetable oils have obtained increasing attention as public policy makers and corporations alike have been interested in replacing traditional petrochemical feedstocks due to their environmental and economic impact.

To date, moderate success has been achieved through the application of traditional cationic and free radical polymerization routes to vegetable oils to yield thermoset plastics (i.e., plastics which, once synthesized, permanently retain their shape and are not subject to further processing). For example, a variety of polymers, ranging from soft rubbers to hard, tough plastics were made by using cationic copolymerization of vegetable oils, mainly soybean oil (SBO), using boron triflouridediethyletherate (BFE) as initiator (Andjelkovic et al., "Novel Polymeric Materials from Soybean Oils: Synthesis, Properties, and Potential Applications," *ACS Symposium Series*, 921: 67-81 (2006); Daniel & Larock, "Thermophysical properties of conjugated soybean oil/corn stover biocomposites." *Bioresource Technology* 101 (15):6200-06 (2010)). Soybean-oil-based waterborne polyurethane films were synthesized with different properties ranging from elastomeric polymers to rigid plastics by changing the polyol functionality and hard segment content of the polymers (Lu et al., "New Sheet Molding Compound Resins From Soybean Oil. I. Synthesis and Characterization," *Polymer* 46(1):71-80 (2005); Lu et al., "Surfactant-Free Core-Shell Hybrid Latexes From Soybean Oil-Based Waterborne Polyurethanes and Poly(Styrene-Butyl Acrylate)," *Progress in Organic Coatings* 71(4):336-42 (2011)). Moreover, soybean oil was used to synthesize different bio-based products such as sheet molding composites, elastomers, coatings, foams, etc. (Zhu et al., "Nanoclay Reinforced Bio-Based Elastomers: Synthesis and Characterization," *Polymer* 47(24):8106-15 (2006)). Bunker et al. (Bunker et al., "Miniemulsion Polymerization of Acrylated Methyl Oleate for Pressure Sensitive Adhesives," *International Journal of Adhesion and Adhesives* 23(1):29-38 (2003); Bunker et al., "Synthesis and Characterization of Monomers and Polymers for Adhesives from Methyl Oleate," *Journal of Polymer Science Part A: Polymer Chemistry* 40(4):451-58 (2002)) synthesized pressure sensitive adhesives using mini-emulsion polymerization of acrylated-methyloleate, a monoglyceride derived from soy bean oil; the polymers produced were comparable to their petroleum counterparts. Zhu et al., "Nanoclay Reinforced Bio-Based Elastomers: Synthesis and Characterization," *Polymer* 47(24):8106-15 (2006), generated an elastic network based on acrylated oleic methyl ester through bulk polymerization using ethylene glycol as the crosslinker, obtaining a high molecular weight linear polymer using mini-emulsion polymerization. Lu et al., "New Sheet Molding Compound Resins From Soybean Oil. I. Synthesis and Characterization," *Polymer* 46(1):71-80 (2005), created thermosetting resins synthesized from soybean oil that can be used in sheet molding compound applications by introducing acid functionality onto the soybean and reacting the acid groups with divalent metallic oxides or hydroxides, forming the sheet. Bonnaillie et al., "Thermosetting Foam With a High Bio-Based Content From Acrylated Epoxidized Soybean Oil and Carbon Dioxide," *Journal of Applied Polymer Science* 105 (3): 1042-52 (2007), created a thermosetting foam system using a pressurized carbon dioxide foaming process of acrylated epoxidized soybean oil (AESO). U.S. Pat. No. 6,121,398 to Khot et al., synthesized liquid molding resins that are able to cure into high modulus thermosetting polymers and composites using triglycerides derived from plant oils.

However, uncontrolled chain branching and crosslinking is inevitable by using these conventional polymerization routes due to the multifunctional nature of triglycerides, multiple initiation sites along the chain backbone, and chain transfer/termination reactions. While these thermoset materials may indeed supplant a number of petrochemically-derived thermosets, the vast majority of commodity polymers are highly processable thermoplastic materials. There is thus a need in the art to develop from vegetable oils a highly processable thermoplastic and elastomeric polymer with a wide range of applications and physical properties.

The present invention is directed to fulfilling these needs in the art.

SUMMARY OF THE INVENTION

One aspect of the present invention relates to a thermoplastic block copolymer comprising at least one PA block and at least one PB block. The PA block represents a polymer block comprising one or more units of monomer A, and the PB block represents a polymer block comprising one or more units of monomer B. Monomer A is a vinyl, acrylic, diolefin, nitrile, dinitrile, acrylonitrile monomer, a monomer with reactive functionality, or a crosslinking monomer. Monomer B is a radically polymerizable triglyceride or mixture thereof, in the form of a plant oil, animal oil, or synthetic triglycerides. One end or both ends of the PA block or PB block in the thermoplastic block copolymer is functionalized with a thiocarbonylthio chain transfer group.

Another aspect of the present invention relates to a telechelic thermoplastic block copolymer having an architecture of $(PA-PB)_n$-TCTA-$(PB-PA)_n$ or $(PB-PA)_n$-TCTA-$(PA-PB)_n$, where n is an integer ranging from 1 to 10. TCTA is a moiety in the PB block or PA block from a telechelic chain transfer agent used to produce the telechelic thermoplastic block copolymer. The PA block represents a polymer block comprising one or more units of monomer A, and the PB block represents a polymer block comprising one or more units of monomer B. Monomer A is a vinyl, acrylic, diolefin, nitrile, dinitrile, acrylonitrile monomer, a monomer with reactive functionality, or a crosslinking monomer. Monomer B is a radically polymerizable triglyceride or mixtures thereof, in the form of a plant oil, animal oil, or synthetic triglycerides.

Another aspect of the present invention relates to a thermoplastic statistical copolymer having a general formula of $[A_i\text{-}B_j\text{-}C_k]_q$. In the formula, A represents monomer A, which is a vinyl, acrylic, diolefin, nitrile, dinitrile, acrylonitrile monomer, a monomer with reactive functionality, or a crosslinking monomer. B represents monomer B, which is a radically polymerizable triglyceride or mixture thereof, in the form of a plant oil, animal oil, or synthetic triglycerides. C represents monomer C, which is a vinyl, acrylic, diolefin, nitrile, dinitrile, acrylonitrile monomer, a monomer with reactive functionality, or a crosslinking monomer; or a radically polymerizable triglyceride or mixture thereof, in the form of a plant oil, animal oil, or synthetic triglycerides, provided monomer C is different than the monomer A or monomer B. i,j, and k are average number of repeating units of monomer A, monomer B, and monomer C, respectively, such that i and j are each greater than 0 and less than 1, k is 0 to less than 1, provided i+j+k=1. q represents the number average degree of polymerization and ranges from 10 to 100,000.

One aspect of the present invention also relates to a method of preparing a thermoplastic block copolymer. The method comprises providing a radically polymerizable monomer, represented by A, or a polymer block PA comprising one or more units of monomer A. A radically polymerizable triglyceride or mixture thereof, in the form of a plant oil, animal oil, or synthetic triglycerides, represented by B, is also provided. Monomer A or the polymer block PA is polymerized with monomer B via reversible addition-fragmentation chain-transfer polymerization (RAFT), in the presence of a free radical initiator and a chain transfer agent, to form the thermoplastic block copolymer. The polymerizing step is carried out under conditions effective to achieve a number average degree of polymerization ($N_n$) for the thermoplastic block copolymer of up to 100,000 without gelation.

Alternatively, the method of preparing a thermoplastic block copolymer comprises providing a radically polymerizable triglyceride or mixture thereof, in the form of a plant oil, animal oil, or synthetic triglycerides, represented by B, or a polymer block PB comprising one or more units of monomer B. A radically polymerizable monomer, represented by A is also provided. Monomer B or the polymer block PB is polymerized with monomer A via RAFT, in the presence of a free radical initiator and a chain transfer agent, to form the thermoplastic block copolymer. The polymerizing step is carried out under conditions effective to achieve a number average degree of polymerization ($N_n$) for the thermoplastic block copolymer of up to 100,000 without gelation.

Another aspect of the present invention relates to a method of preparing a thermoplastic homopolymer. The method comprises providing a radically polymerizable triglyceride or mixture thereof, in the form of a plant oil, animal oil, or synthetic triglycerides. This triglyceride-based monomer is then polymerized via RAFT, in the presence of a free radical initiator and a chain transfer agent, to form the thermoplastic homopolymer. The polymerizing step is carried out under conditions effective to achieve a number average degree of polymerization ($N_n$) for the thermoplastic homopolymer of up to 100,000 without gelation.

Another aspect of the present invention relates to a method of preparing a thermoplastic statistical copolymer. The method comprises providing a radically polymerizable monomer, represented by A. A radically polymerizable triglyceride or mixture thereof, in the form of a plant oil, animal oil, or synthetic triglycerides, represented by B is also provided. Monomer A and monomer B are simultaneously polymerized, via RAFT, in the presence of a free radical initiator and a chain transfer agent to form the thermoplastic statistical copolymer. The polymerizing step is carried out under conditions effective to achieve a number average degree of polymerization ($N_n$) for the thermoplastic statistical copolymer of up to 100,000 without gelation.

The present invention involves the successful application of reversible addition-fragmentation chain transfer polymerization (RAFT) to biofeedstocks such as soybean oil, comprised predominantly of mixtures of triglycerides. The distinctive feature of this chemistry is that it allows the design of the molecular architecture of the resultant polymers such that they are predominantly non-crosslinked linear or lightly branched chains that behave as elastomers/ rubbers at room temperature but reversibly melt and are susceptible to common processing techniques at elevated temperatures. RAFT has received a great deal of attention with respect to petrochemical feedstocks, but it has not been successfully applied to biofeedstocks such as soybean oil. The success of the technology on vegetable oils such as soybean oil is surprising, as conventional radical polymerization typically brings the polymerization of triglycerides into thermoset materials, whereas the present invention successfully controls the polymerization of triglyceride so that it terminates at a desired molecular weight and block composition and produces thermoplastic polysoybean oil.

RAFT polymerization limits the number of initiation sites and drastically reduces the rate of polymer-to-polymer chain transfer and termination reactions, and also introduces the capability to produce custom chain architectures such as block copolymers (BCPs) and statistical copolymers. This degree of control is superior to that offered by other controlled radical polymerization methods—that is, polymers of higher molar mass may be obtained over a shorter period of time with less rigorous purification.

Typical monomers for chain-growth derived thermoplastic polymers are monofunctional, that is, the monomer contains only a single polymerizable functional group. Triglycerides contain a number of double bonds (which varies greatly within parent plant oil or animal oil species and even between cultivars of the same species) and so as triglyceride monomers for polymerization will exhibit at least two varying functionalities. Accordingly, each polytriglyceride repeat unit has the potential to crosslink with at least one other polytriglyceride; when approximately a fraction of 1/N of such units have crosslinked (N denotes the number of repeat units in a polymer chain), the polymers are said to be at their "gel point" at which an infinite polymer network has formed and the material is a thermoset.

In conventional RAFT polymerization, the classical Flory-Stockmeyer theory as well as a newer treatment of controlled radical polymerizations by GENNADY V. KOROLYOV AND MICHAEL MOGILEVICH, THREE-DIMENSIONAL FREE-RADICAL POLYMERIZATION CROSS-LINKED AND HYPER-BRANCHED POLYMERS (Springer, Berlin, 2009), which is incorporated herein by reference in its entirety, predicts a gelation at a critical conversion rate $\alpha_{cr}$ given by $\alpha_{cr}(N_w-1)=1$. According to this classical theory, the gel point is expected to occur at a critical conversion $\alpha_{cr}<0.1$ for multifunctional monomer; i.e. gelation is expected to occur while the forming polymers are still in their oligomeric stage. Thus, when the reactivity of a propagating chain towards all functional sites on both free monomers and repeat units that are already incorporated into a chain are identical, the expectation is that the gel point will be reached at an extremely low conversion, such that, prior to gelation, the polytriglyceride has not yet achieved a degree of polymerization sufficient for useful mechanical properties to develop. This expectation is supported by the past two decades of reports of thermosets from vegetable oils produced by conventional cationic and free radical polymerization. The expectation of early gelation would also extend to RAFT if the reactivity ratios between propagating radials and all unreacted functional sites on the triglycerides were rigorously identical.

However, the RAFT method of the present invention enables a monomer conversion (which is defined as the mass ratio of the polymers produced to the monomers provided) of roughly 90%. In accordance with the present invention, preferences for free monomers can be exacerbated through the appropriate selection of a chain transfer agent and its ratio relative to the monomer; reaction temperature; and a solvent and its concentration. Under such conditions, it is possible to produce polymerized triglycerides to targeted number average degree of polymerization ($N_n$) for the thermoplastic polymer of up to 100,000 prior to the gelpoint. The use of highly excess CTA agent promotes the incorporation of CTA fragments into the polymer backbone. This in turn causes hyper-branching to occur rather than cross-linking in the polymer. Thus, the polymerized triglycerides via RAFT of the present invention can reach number average degree of polymerization ($N_n$) for the thermoplastic polymer of up to 100,000 without gelation.

Polymerized triglycerides, such as those found in soybean oil, are intrinsically renewable, are environmental friendly, and may also be shown to exhibit biodegradability. The elastomeric properties of the vegetable oil polymer appear to be competitive with modern commodities such as polybutadiene (synthetic rubber). Further, the cost of the vegetable oil monomer has become highly competitive in recent years. In many cases the biomonomers are more economical than petrochemical feedstocks (e.g., a ton of vegetable oil costs less than $1,200, whereas a ton of butadiene costs greater than $4,000). Thus, the novel thermoplastic homopolymers, block copolymers or statistical copolymers of the present invention provide a cost-effective, environment-friendly, viable alternatives for the conventional petrochemically-derived polymeric materials.

These polymerized triglyceride-based thermoplastic homopolymers, block copolymers, or statistical copolymers are suitable in various applications, such as asphalt modifiers or viscosity modifier for consumer care products, adhesives, sealants, rubber compositions, in the automobile industry, footwear, packaging, in the consumer electronics, etc.

BRIEF DESCRIPTION OF THE DRAWINGS

FIG. 1 is a schematic drawing illustrating the preparation of bio-polymeric thermoplastic elastomers (TPE) from soybean oil via RAFT polymerization mechanism, described in Moad et al., "Living Radical Polymerization by the Raft Process—a First Update," *Australian Journal of Chemistry* 59: 669-92 (2006), which is incorporated herein by reference in its entirety.

DETAILED DESCRIPTION OF THE INVENTION

Figure 2:
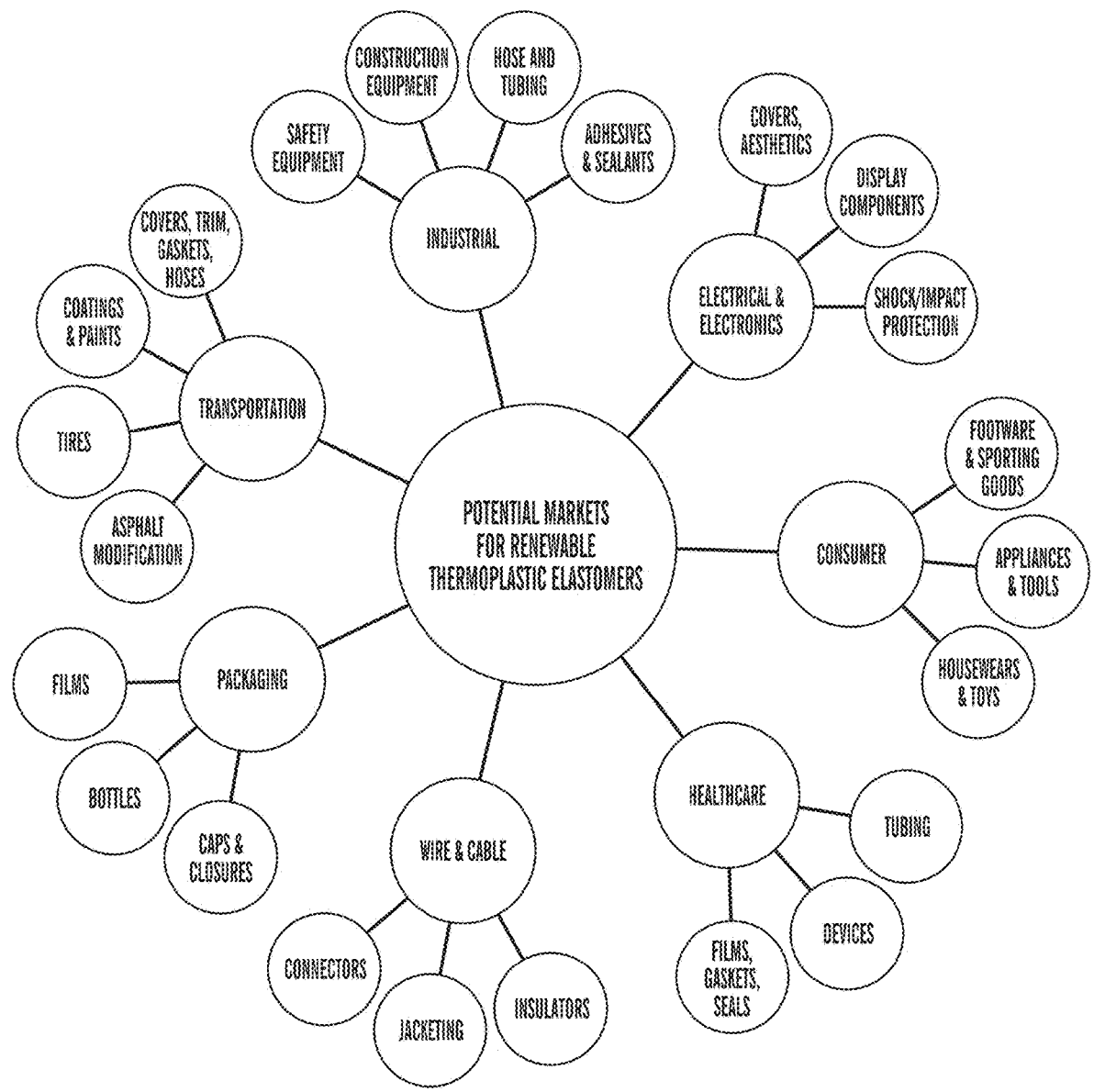
FIG. 2 is a schematic drawing depicting usages of the plant oil- or animal oil-based thermoplastic elastomers in various markets.

One aspect of the present invention relates to a thermoplastic block copolymer comprising at least one PA block and at least one PB block. The PA block represents a polymer block comprising one or more units of monomer A, and the PB block represents a polymer block comprising one or more units of monomer B. Monomer A is a vinyl, acrylic, diolefin, nitrile, dinitrile, acrylonitrile monomer, a monomer with reactive functionality, or a crosslinking monomer. Monomer B is a radically polymerizable triglyceride or mixture thereof, typically in the form of a plant oil, animal oil, or synthetic triglycerides. One end or both ends of the PA block or PB block in the thermoplastic block copolymer is/are functionalized with a thiocarbonylthio chain transfer group. For example, the polymer chain can have one end or both ends with a thiocarbonylthio ending derived from the thiocarbonylthio chain transfer group-like ($P_nS(Z)C=S$, 3), as shown in FIG. 1. The thiocarbonylthio chain transfer group has been described herein. A more extensive list of thiocarbonylthio CTA agents (or RAFT agents) can be found in Moad et al., "Living Radical Polymerization by the Raft Process—a First Update," *Australian Journal of Chemistry* 59: 669-92 (2006); Moad et al., "Living Radical Polymerization by the Raft Process—a Second Update," *Australian Journal of Chemistry* 62(11): 1402-72 (2009); Moad et al., "Living Radical Polymerization by the Raft Process—a Third Update," *Australian Journal of Chemistry* 65: 985-1076 (2012); Skey et al., "Facile one pot synthesis of a range of reversible addition-fragmentation chain transfer (RAFT) agents," *Chemical Communications* 35: 4183-85 (2008), which are hereby incorporated by reference in their entirety.

The thermoplastic block copolymer can be a linear or light-branched copolymer, and can contain two or more blocks. Exemplary copolymer architecture includes, but is not limited to $(PA-PB)_n$, $(PA-PB)_n$-PA, and $PB-(PA-PB)_n$. n is an integer greater than 0. For example, n ranges from 1 to 50, from 1 to 10, or from 1 to 5. The block copolymer typically has a di-block polymer architecture (PA-PB), tri-block polymer architecture (PA-PB-PA or PB-PA-PB) or penta-block polymer architecture (PA-PB-PA-PB-PA or PB-PA-PB-PA-PB). The blocks of the copolymer are formed by sequential additions alternating between monomer A and monomer B until the desired multiblock architecture has been achieved. Each monomer A unit or monomer B unit in architecture may be the same or different.

Another aspect of the present invention relates to a telechelic thermoplastic block copolymer having an architecture of $(PA-PB)_n$-TCTA-$(PB-PA)_n$ or $(PB-PA)_n$-TCTA-$(PA-PB)_n$, where n is an integer ranging from 1 to 10. TCTA is a moiety in the PB block or PA block from a telechelic chain transfer agent used to produce the telechelic thermoplastic block copolymer. The PA block represents a polymer block comprising one or more units of monomer A, and the PB block represents a polymer block comprising one or more units of monomer B. Monomer A is a vinyl, acrylic, diolefin, nitrile, dinitrile, acrylonitrile monomer, a monomer with reactive functionality, or a crosslinking monomer. Monomer B is a radically polymerizable triglyceride or mixtures thereof, in the form of a plant oil, animal oil, or synthetic triglycerides. TCTA is a moiety derived from a "telechelic chain transfer agent", e.g., a trithiocarbonate moiety or any other moiety from a telechelic CTA agent used to produce the telechelic thermoplastic block copolymers. n is an integer ranging from 1 to 50, or from 1 to 10. The structures and mechanism of making the telechelic thermoplastic block copolymers have been described herein.

The telechelic thermoplastic block copolymer can be a linear or light-branched copolymer, and can contain three or more blocks. The block copolymer typically has symmetrical tri-block polymer architecture (PA-PB-TCTA-PB-PA or PB-PA-TCTA-PA-PB) or a penta-block polymer architecture (PA-PB-PA-TCTA-PA-PB-PA or PB-PA-PB-TCTA-PB-PA-PB). TCTA is a moiety derived from a telechelic chain transfer agent in the PB block (PB-TCTA-PB) or in the PA block (PA-TCTA-PA). Each monomer A unit or monomer B unit in the architecture may be the same or different, provided that the overall architecture is symmetrical, e.g., $PA_1$-PB-$PA_2$-PB-$PA_1$ ($A_1$ and $A_2$ refer to different kinds of monomer for monomer unit A).

The PA block is made by polymerizing one or more radically polymerizable monomers, and has an average molecular weight of about 1 to about 1000 kDa, or about 10 to about 30 kDa. The PA block may comprise repeating units of monomer A. For instance, the PA block can be a polymerized linear-chain or branched-chain monomer A or radicals thereof. The PB block is made by polymerizing one or more triglyceride or mixtures of triglycerides, typically in the form of a plant oil, animal oil, or synthetic triglycerides, and has an average molecular weight of about 5 to about 1000 kDa, about 10 to about 500 kDa, about 40 to about 100 kDa, or about 80 to about 100 kDa. The PB block may comprise repeating units of triglyceride or mixtures of triglycerides. For instance, the PB block can be a polymerized linear-chain or branched-chain monomeric plant oil or animal oil, or radicals thereof.

PA-PB di-block copolymers typically contain about 5 wt % to about 95 wt % of the polymerized A block and about 95 wt % to about 5 wt % of polymerized triglyceride block. PA-PB-PA or PB-PA-PB tri-block copolymers typically contain about 5 wt % to about 95 wt % of the polymerized A block and about 95 wt % to about 5 wt % of polymerized triglyceride block. PA-PB-PA-PB-PA or PB-PA-PB-PA-PB penta-block copolymers typically contain about 5 wt % to about 95 wt % of the polymerized A block and about 95 wt % to about 5 wt % of polymerized triglyceride block. For instance, the above block copolymers may contain about 10 wt % to about 90 wt % of the polymerized A block and about 90 wt % to about 10 wt % of polymerized triglyceride block. Adjusting the relative percentage composition of the PA or the PB block can tune the property of the block copolymer to make it more suitable for different applications. For example, block copolymers containing a relatively low concentration of PA block are suitable for elastomers/adhesives whereas a block copolymer containing a relatively high concentration of PA blocks are suitable for tough engineering materials (e.g. like Plexiglas® or high-impact polystyrene).

The PA block of the block copolymer can be considered as a "hard" block, and has properties characteristic of thermoplastic substances in that it has the stability necessary for processing at elevated temperatures and yet possesses good strength below the temperature at which it softens. The PA block is polymerized from one or more radically polymerizable monomers, which can include a variety type of monomers such as vinyl (such as vinyl aromatic), acrylic (such as methacrylates, acrylates, methacrylamides, acrylamides, etc.), diolefin, nitrile, dinitrile, acrylonitrile monomer, a monomer with reactive functionality, and a crosslinking monomer.

Vinyl aromatic monomers are exemplary vinyl monomers that can be used in the block copolymer, and include any vinyl aromatics optionally having one or more substituents on the aromatic moiety. The aromatic moiety can be either mono- or polycyclic. Exemplary vinyl aromatic monomers for the PA block include styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylates include $C_1$-$C_6$ (meth)acrylate (i.e., methyl methacrylate, ethyl methacrylate, propyl (meth)acrylate, butyl (meth)acrylate, isobutyl methacrylate, heptyl (meth)acrylate, or hexyl (meth)acrylate), 2-(acetoacetoxy)ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFPMA), 2-(trimethylamonium)ethyl methacrylate (TMAEMA), 3-(trimethylamonium)propyl methacrylate (TMAPMA), triphenylmethyl methacrylate (TPMMA), etc. Other exemplary acrylates include 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino) ethyl acrylate (DMAEA), ethyl acrylate (EA), ethyl a-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), tert-butyl acrylate (tBA), etc. Exemplary methacrylamides include N-(2-aminoethyl)methacrylamide (hydrochloride) (AEMAm) and N-(3-aminopropyl)methacrylamide (hydrochloride) (APMAm), N-(2-(dimethylamino)ethyl)acrylamide (DEAPMAm), N-(3-(dimethylamino)propyl)methacrylamide (hydrochloride) (DMAPMAm), etc. Other exemplary acrylamides include acrylamide (Am) 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N-(2-(dimethylamino)ethyl) acrylamide (DMAEAm), N-isopropylacrylamide (NIPAm), N-octylacrylamide (OAm), etc. Exemplary nitriles include acrylonitrile, adiponitrile, methacrylonitrile, etc. Exemplary diolefins include butadiene, isoprene, etc.

The radically polymerizable monomers suitable for usage herein also include those monomers with reactive functionality, e.g., a 'clickable' functionality so that when the monomers are incorporated in blocks, these 'clickable' functional groups can be used as a precursor to a polymer brush or copolymerized to provide sites for the attachment of functionality or for crosslinking. Exemplary reactive functionality include functional groups suitable for azide-alkyne 1,3-dipolar cycloaddition, such as azide functionality; "active ester" functional groups that are particular active with primary amine functionality; functional groups with protected thiol, hydrazide or amino functionality; functional groups with isocyanate or isothiocyanate functionality, etc.

The radically polymerizable monomers suitable for usage herein can also include those crosslinking monomers that are typically used both in the synthesis of microgels and polymer networks (see below). The monomers can include degradable crosslinks such as an acetal linkage, or disulfide linkages, resulting in the formation of degradable crosslinks. Exemplary crosslinking monomers diethyleneglycol dimethacrylate (DEGDMA), triethylene glycol dimethacrylate (TEGDMA), ethyleneglycol dimethacrylate (EGDMA), hexane-1,6-diol diacrylate (HDDA), methylene-bis-acrylamide (MBAm), divinylbenzene (DVB), etc.

A more extensive list of exemplary methacrylate monomers, acrylate monomers, methacrylamide monomers, acrylamide monomers, styrenic monomers, diene monomers, vinyl monomers, monomers with reactive functionality, and crosslinking monomers that are suitable for usage as the radically polymerizable monomers herein has been described in Moad et al., "Living Radical Polymerization by the Raft Process—a Third Update," *Australian Journal of Chemistry* 65: 985-1076 (2012), which is hereby incorporated by reference in its entirety.

Moreover, two or more different monomers can be used together in the formation of the PA block or different PA block in the copolymer. A typical radically polymerizable monomer A used herein is styrene, and the resulting PA block is a styrene homopolymer. Another typical radically polymerizable monomer A used herein is methyl acrylate, and the resulting PA block is a methyl acrylate homopolymer.

The PB block of the block copolymer can be considered as a "soft" block, and has elastomeric properties which allow it to absorb and dissipate an applied stress and then regain its shape. The PB block is polymerized from one or more monomeric triglycerides, typically derived from a plant oil, animal fat, or a synthetic triglyceride. This polymerized plant oil or animal oil can be subsequently partially or fully saturated via a catalytic hydrogenation post-polymerization. The monomeric oils used in the block copolymer can be any triglycerides or triglyceride mixtures that are radically polymerizable. These triglycerides or triglyceride mixtures are typically plant oils. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Typical compositions of several exemplary vegetable oils are shown in Table 1. Typical vegetable oil used herein includes soybean oil, linseed oil, corn oil, flax seed oil, or rapeseed oil, and the resulting PB block is polymerized triglyceride or triglyceride derivatives.

TABLE 1

Typical compositions of vegetable oils.

| Vegetable oil | Linoleic acid (%) | Polyunsaturated (%) | Monounsaturated (%) | Saturated (%) |
|---|---|---|---|---|
| Soybean | 54 | 63 | 22 | 15 |
| Safflower | 78 | 78 | 13 | 9 |
| Sunflower | 75 | 75 | 14 | 11 |
| Walnut | 64 | 64 | 22 | 14 |
| Corn | 59 | 60 | 27 | 13 |
| Sesame | 43 | 43 | 43 | 14 |
| Peanut | 31 | 31 | 51 | 18 |

Vegetable oils and animal fats are mixtures of triglycerides. A representative structure of a triglyceride is shown as below:

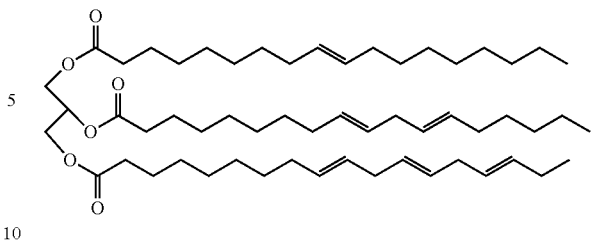

A typical triglyceride structure contains a number of double bonds that may serve as candidates for polymerization. Various soybean cultivars express a variety of triglyceride compositions in their oils. Different strains of soybeans may be appropriately selected based on the triglyceride compositions to enhance the block copolymer yield and properties.

Soybean Oil (SBO) is the most abundant vegetable oil, which accounts for almost 30% of the world's vegetable oil supply. SBO is particularly suitable for polymerization, because it possesses multiple carbon-carbon double bonds that allow for modifications such as conjugation of the double bonds, etc.

In unprocessed oils, the double bonds contained in triglycerides are typically located in the middle of the alkyl chains, and have limited reactivity towards propagation reactions due to steric hindrance and unfavorable stability of the free radical. This reactivity improves dramatically when the double bonds are conjugated (Li et al., "Soybean Oil-Divinylbenzene Thermosetting Polymers: Synthesis, Structure, Properties and their Relationships," *Polymer* 42(4): 1567-1579 (2001); Henna et al., "Biobased Thermosets from Free Radical Copolymerization of Conjugated Linseed Oil," *Journal of Applied Polymer Science* 104:979-985 (2007); Valverde et al., "Conjugated Low-Saturation Soybean Oil Thermosets: Free-Radical Copolymerization with Dicyclopentadiene and Divinylbenzene," *Journal of Applied Polymer Science* 107:423-430 (2008); Robertson et al., "Toughening of Polylactide with Polymerized Soybean Oil," *Macromolecules* 43:1807-1814 (2010), which are hereby incorporated by reference in their entirety). The conjugation of double bonds in triglycerides may be readily achieved to nearly 100% conversion with homogeneous Rh catalysis (Larock et al., "Preparation of Conjugated Soybean Oil and Other Natural Oils and Fatty Acids by Homogeneous Transition Metal Catalysis," *Journal of the American Oil Chemists' Society* 78:447-453 (2001), which is hereby incorporated by reference in its entirety).

In any embodiment of the present invention, the polymerizable plant oil monomer containing triglyceride can be replaced with a polymerizable monomer containing one or more triglycerides from an animal source, for instance, animal fats. Thus, the PB block in any embodiment of the present invention can instead be polymerized from one or more monomeric animal fat containing one or more triglycerides. Examples of suitable animal fats used in accordance with the present invention include, but are not limited to, beef or mutton fat such as beef tallow or mutton tallow, pork fat such as pork lard, poultry fat such as turkey and/or chicken fat, and fish fat/oil. The animal fats can be obtained from any suitable source including restaurants and meat production facilities.

"Triglycerides," as defined herein, may refer to any unmodified triglycerides naturally existent in plant oil or animal oil or animal fat as well as any derivatives of unmodified triglycerides, such as synthetically derived triglycerides. The naturally existent parent oil may also contain derivatives of triglycerides, such as free fatty acids. An unmodified triglyceride may include any ester derived from glycerol with three similar or different fatty acids. Triglyceride derivatives may include any modified triglycerides that contain conjugated systems (i.e. a system of connected p-orbitals with delocalized electrons in triglycerides). Such conjugated systems increase the reactivity of triglycerides towards propagation reactions. Useful conjugated triglycerides include, but are not limited to, triglyceride derivatives containing conjugated double bonds or conjugated systems formed by acrylate groups.

The term "soybean oil" used herein may refer broadly to any raw soybean oil or processed soybean oil that contains at least one form of triglyceride or its derivative suitable for the polymerization reaction of the present invention. The term "conjugated soybean oil" used herein refers to any raw soybean oil or processed soybean oil containing at least one triglyceride with at least one conjugated site. Similar definitions also apply to other plant oils, animal oils, conjugated plant oils, conjugated animal oils, or synthetically derived triglyceride-based oils.

The conjugated triglyceride may contain one or more conjugated sites. For instance, the conjugated triglyceride may contain a single conjugated site per triglyceride. Alternatively, each fatty-acid chain of the triglyceride may contain one or more conjugated sites.

Exemplary conjugated triglycerides are:

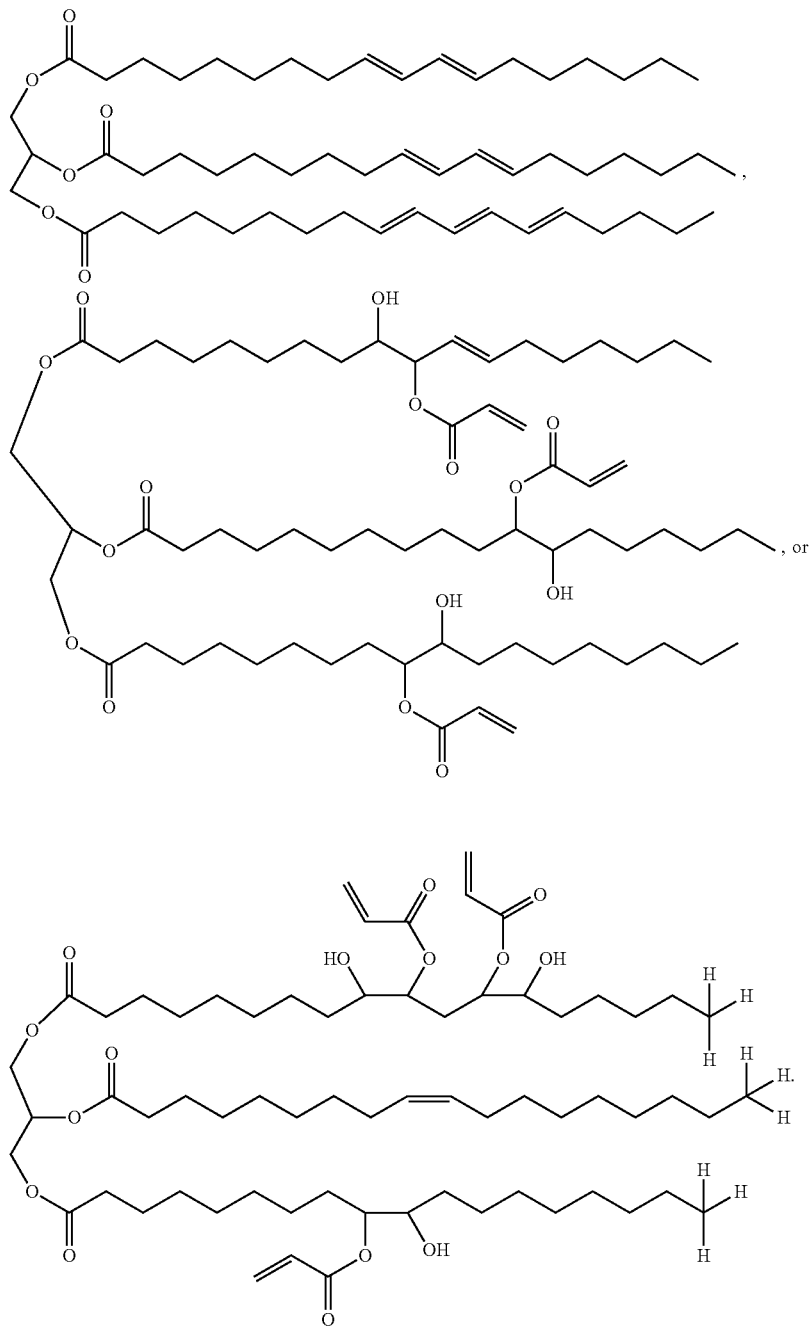

A further description of conjugation sites in soybean oil, epoxidation of soybean oil, and acrylation of soybean oil can be found in NACU BERNARDO HERNANDEZ-CANTU, "SUSTAINABILITY THROUGH BLOCKCOPOLYMERS—NOVEL ION EXCHANGE CATHODE MEMBRANES AND SOYBEAN OIL BASED THERMOPLASTIC ELASTOMER," (Iowa State University, Ames, Iowa 2012), which is incorporated herein by reference in its entirety.

In one embodiment, the conjugated plant oil or animal oil is acrylated epoxidized plant oil or animal oil, such as acrylated epoxidized soybean oil or acrylated epoxidized corn oil; the conjugated triglyceride is acrylated epoxidized triglyceride.

In any embodiment of the present invention, the block copolymer is a thermoplastic elastomer. The mechanism for achieving the dual properties of thermoplasticity and elasticity/toughness in the plant oil or animal oil-based styrenic block copolymer arises from polymer thermodynamics and the chain architecture of the polymer. Flory-Huggins theory illustrates that nearly all polymers are mutually immiscible, due to the drastic loss of mixing entropy. The chemically dissimilar monomer sequences found in the block copolymers may be thought of conceptually as immiscible homopolymers bound covalently end-to-end. Due to this constraint, when a block copolymer phase separates, incompatible polymer types form meso-domains with a geometry dictated by the block composition and with a size governed by the overall molecular weight (Bates et al. "Block Copolymers-Designer Soft Materials," *Physics Today* 52(2):32-38 (1999), which is hereby incorporated by reference in its entirety). In block copolymers with modest polydispersity, these meso-domains have well-defined geometries and become statistical in nature as the polydisersity index increases beyond approximately 1.5 (Widin et al, "Unexpected Consequences of Block Polydispersity on the Self-Assembly of ABA Triblock Copolymers", *Journal of the American Chemical Society*, 134(8):3834-44 (2012), which is hereby incorporated by reference in its entirety).

In a typical SBS elastomer, the styrene composition is about 10-30 wt % such that spherical or cylindrical styrene domains form in a matrix of butadiene. When the temperature is below the glass transition temperature of polystyrene ($T_g$=100° C.), the polybutadiene matrix is liquid ($T_g$<-90° C.) but is bound between the vitreous polystyrene spheres, which serve as physical crosslinks. When the temperature is above the glass transition temperature of polystyrene, the entire elastomer system is molten and may be processed easily. Crosslinked poly(soybean oil) has been reported to have $T_g$ values as low as -56° C. (Yang et al., "Conjugation of Soybean Oil and It's Free-Radical Copolymerization with Acrylonitrile," *Journal of Polymers and the Environment* 1-7 (2010), which is hereby incorporated by reference in its entirety). Thus, the poly(soybean oil) is an excellent candidate to serve as the liquid component in thermoplastic elastomers based on styrenic block copolymers.

Accordingly, in one embodiment of the present invention, the thermoplastic and elastomeric block copolymer has a PA-PB diblock polymer architecture, where the PA block is a linear-chain polystyrene (PS) and the PB block is a linear or light-branched polymerized soybean oil (PSBO) or radicals thereof, or polymerized conjugated soybean oil (PCSBO) or radicals thereof. The PS-PSBO di-block copolymer has a molecular weight ranging from 5 to 10,000 kDa, for instance, from 5 to 500 kDa, from about 15 to 300 kDa, from about 40 to about 100 kDa, or from about 80 to about 100 kDa. The PSBO block has a glass transition temperature ($T_g$) below -10° C., or below -15° C., for instance, from about -60° C. to about -12° C., or from about -60° C. to about -28° C.

In one embodiment of the present invention, the thermoplastic and elastomeric block copolymer has a PA-PB-PA triblock polymer architecture, where the PA block is a linear-chain polystyrene (PS), and the PB block is a linear or light-branched polymerized soybean oil (PSBO) or radicals thereof, or polymerized conjugated soybean oil (PCSBO) or radicals thereof. This soybean oil-based styrenic triblock copolymer (PS-PSBO-PS) thus has an elastomeric interior block PSBO, and a thermoplastic outer block PS formed on both ends of the interior block PSBO. The PS-PSBO-PS tri-block copolymer has a molecular weight ranging from 7 kDa to 10,000 kDa, for instance, from 7 kDa to 1000 kDa, from about 7 to about 500 kDa, from about 15 to about 350 kDa, from about 80 to about 120 kDa or from about 100 to about 120 kDa. The PSBO block has a $T_g$ below -10° C., or below -15° C., for instance, from about -60° C. to about -12° C., or from about -60° C. to about -28° C.

In one embodiment, the triglyceride mixture to be radically polymerized is soybean oil, linseed oil, flax seed oil, corn oil, or rapeseed oil. In one embodiment, acrylated epoxidized triglyceride mixture, such as acrylated epoxidized soybean oil, is radically polymerized in accordance with the method of the present invention.

Another aspect of the present invention relates to a thermoplastic statistical copolymer having a general formula of $[A_i\text{-}B_j\text{-}C_k]_q$. In the formula, A represents monomer A, which is a vinyl, acrylic, diolefin, nitrile, dinitrile, acrylonitrile monomer, a monomer with reactive functionality, or a crosslinking monomer. B represents monomer B, which is a radically polymerizable triglyceride or mixture thereof, in the form of a plant oil, animal oil, or synthetic triglycerides. C represents monomer C, which is a vinyl, acrylic, diolefin, nitrile, dinitrile, acrylonitrile monomer, a monomer with reactive functionality, or a crosslinking monomer; or a radically polymerizable triglyceride or mixture thereof, typically in the form of a plant oil, animal oil, or synthetic triglycerides, provided monomer C is different than the monomer A or monomer B. i,j, and k are average number of repeating units of monomer A, monomer B, and monomer C, respectively, such that i and j are each greater than 0 and less than 1, k is 0 to less than 1, provided i+j+k=1. q represents the number average degree of polymerization and ranges from 10 to 100,000, for instance from 10 to 10,000, or from 500 to 1500.

The thermoplastic statistical copolymer can be linear or branched and can contain statistical sequences of A, B, or C monomer. A represents a monomer unit A, which is radically polymerizable. Monomer unit A represents a "hard" segment which confers the thermoplastic statistical copolymer the stability necessary for processing at elevated temperatures and at the same time good strength below the temperature at which it softens. B represents a monomer unit B, which is a radically polymerizable triglyceride or mixtures of triglycerides. Monomer unit B represents a "soft" segment which confers the thermoplastic statistical copolymer elastomeric characteristics which allows it to absorb and dissipate an applied stress and then regain its shape. C represents a monomer unit C, which is also radically polymerizable. Monomer C may either represent a "hard" segment similar as monomer A or represent a "soft" segment similar as monomer B, but represent monomer different than either A or B. The average repeat sequence within the statistical copolymer is highly dependent upon the relative reactivity ratios for the addition of monomer type j to growing radical type i.

Monomer A or monomer C can be each independently a vinyl, acrylic, diolefin, nitrile, dinitrile, acrylonitrile monomer, or monomer with reactive functionality, or crosslinking monomer. The exemplary embodiments for monomer A and monomer C suitable for usage in the thermoplastic statistical copolymer are the same as the exemplary embodiments for the monomer A, as described above in the thermoplastic block copolymer. Exemplary monomer A and monomer C include styrene, α-methyl styrene, t-butyl styrene, vinyl xylene, vinyl naphthalene, vinyl pyridine, divinyl benzene, vinyl acetate, N-vinylpyrrolidone, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, or mixtures thereof. In one embodiment, the monomer A and the monomer C are each independently a vinyl aromatic monomer, for instance, a styrene. In another embodiment, the monomer A or the monomer C is each independently an acrylate monomer, for instance, a methyl (meth)acrylate.

Monomer B can be a monomeric triglyceride or mixture thereof stemming from any plant oil, animal oil, or synthetic triglyceride that is radically polymerizable, particular those that contain one or more types of triglycerides. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Exemplary plant oil monomer in the statistical copolymer is soybean oil, corn oil, linseed oil, flax seed oil, or rapeseed oil. In one embodiment, the polymerized plant oil is poly(soybean oil). Suitable animal fats include, but are not limited to, beef or mutton fat such as beef tallow or mutton tallow, pork fat such as pork lard, poultry fat such as turkey and/or chicken fat, and fish fat/oil. The animal fats can be obtained from any suitable source including restaurants and meat production facilities. The triglyceride in the plant oil or animal oil can comprise one or more conjugated sites, as described above. In one embodiment, the triglyceride is an acrylated epoxidized triglyceride.

Monomer C can also be a radically polymerizable triglyceride or mixture of triglycerides, but from a different plant oil, animal oil, or synthetic triglyceride than the monomer B, or the triglycerides of the monomer C have a different degree of conjugation than that of monomer B. E.g., the triglycerides of the monomer C and the monomer B can each independently have different degrees of acrylic functionality, ranging from 1 per molecule to 5 per molecule. The embodiments and examples for the monomer C as a radically polymerizable plant oil monomer or animal oil monomer are the same as the embodiments described above for monomer B.

In one embodiment, the monomer C is absent, the monomer A is styrene, the monomer B is soybean oil, linseed oil, corn oil, flax seed oil, or rapeseed oil.

In one embodiment, the monomer A is styrene, the monomer B is soybean oil, linseed oil, corn oil, flax seed oil, or rapeseed oil, and the monomer C is a linear chain-extending monomer, such as diene, a rubbery monomer, such as n-butyl acrylate. A more extensive list of linear chain-extending monomers can be found in Moad et al., "Living Radical Polymerization by the Raft Process—a Third Update," *Australian Journal of Chemistry* 65: 985-1076 (2012), which is hereby incorporated by reference in its entirety.

Other aspects of the present invention relate to the use of the polymerized plant oil- or animal oil-based thermoplastic block copolymers or thermoplastic statistical copolymers in a variety of applications. The benefit of utilizing the polymeric materials of the present invention is multifaceted. The thermoplastic block copolymers thermoplastic statistical copolymers of the present invention are based on vegetable oils, such as soybean oils. Polymerized soybean oil is intrinsically biodegradable and the feedstock is produced through a negative carbon-emissions process (i.e., growing soybeans). Thus, these polymeric materials are attractive from an environmental/biorenewable perspective. Moreover, the elastomeric properties of the soybean oil polymers are competitive with modern commodities such as polybutadiene and polyisoprene (synthetic rubber). The cost of the bio-monomer is highly competitive (in many cases more economical than peterochemically-derived feedstocks). Further, with appropriate modification of the soybean oil (such as conjugation of triglycerides, or development of soybean oil types that are particularly suitable for polymerization), the chemical properties, thermal properties, microstructure and morphology, and mechanical/rheological behaviors of the soybean oil-based polymers can be improved and fine-tuned to make these polymers highly useful in the plastics industry.

Exemplary applications of the thermoplastic block copolymers or thermoplastic statistical copolymers of the present invention include their use: as rubbers or elastomers; as toughened engineering thermoplastics; as components in consumer electronics, such as component for shock/impact protection or cover components; as asphalt modifiers; as resin modifiers; as engineering resins; as leather and cement modifiers; in footwear, such as in rubber shoe heels, rubber shoe soles; in automobiles, such as in tires, hoses, power belts, conveyor belts, printing rolls, rubber wringers, automobile floor mats, mud flaps for trucks, ball mill liners, and weather strips; as sealants or adhesives, such as pressure sensitive adhesives; in aerospace equipment; as viscosity index improvers; as detergents; as diagnostic agents and supports therefore; as dispersants; as emulsifiers; as lubricants and/or surfactants; as paper additives and coating agents; and in packaging, such as food and beverage packaging materials. Exemplary applications of the plant oil- or animal oil-based thermoplastic elastomers in various markets are shown in FIG. 2.

In some embodiments, the polymerized plant oil- or animal oil-based thermoplastic block copolymers or thermoplastic statistical copolymers of the present invention can be used as a main component in a thermoplastic elastomer composition, to improve the thermoplastic and elastic properties of the composition. To form an elastomeric composition, the thermoplastic block copolymer can be further vulcanized, cross-linked, compatibilized, and/or compounded with one or more other materials, such as other elastomer, additive, modifier and/or filler. The resulting elastomer can be used as a rubber composition, in various industries such as in footwear, automobiles, packaging, etc.

In one embodiment, the polymerized plant oil- or animal oil-based thermoplastic block copolymers or thermoplastic statistical copolymers of the present invention can be used in an automobile, such as in vehicle tires, hoses, power belts, conveyor belts, printing rolls, rubber wringers, automobile floor mats, mud flaps for trucks, ball mill liners, and weather strips. The thermoplastic block copolymers can serve as a main component in a thermoplastic elastomer composition, to improve the thermoplastic and elastic properties of the automobile compositions (e.g., vehicle tires). The resulting compositions can be further vulcanized, cross-linked, compatibilized, and/or compounded with one or more other materials, such as other elastomer, additive, modifier and/or filler.

In one embodiment, the polymerized plant oil- or animal oil-based thermoplastic block copolymers or thermoplastic statistical copolymers of the present invention can be used in an asphalt composition, as an asphalt additive, modifier and/or filler. The asphalt composition may further comprise a bitumen component. The asphalt composition may comprise a wide range of the block copolymer. For instance, the asphalt composition comprises 1 to 5 wt % of the thermoplastic block copolymer or thermoplastic statistical copolymers.

In one embodiment, the polymerized plant oil- or animal oil-based thermoplastic block copolymers or thermoplastic statistical copolymers can be used in an adhesive composition. The adhesive composition may further comprise a tackifier and/or a plasticizer.

In one embodiment, the polymerized plant oil- or animal oil-based thermoplastic block copolymers or thermoplastic statistical copolymers can be used in a toughened engineering thermoplastic composition. A toughened engineering thermoplastic composition typically comprises predominantly a glassy or semicrystalline component with a minority of rubbery or elastomeric component to increase the toughness (reduce the brittleness) of the material, e.g. analogous to High-Impact Polystyrene (HIPS). To form a toughened engineering thermoplastic composition, the block copolymer of the present invention may be formulated such that the plant-oil block is a minority component and serves to absorb energy that would otherwise lead to the fracture of the solid matrix. The block copolymer or the statistical copolymer in the toughened engineering thermoplastic composition may be further compounded with other materials, such as other engineering thermoplastics, additives, modifiers, or fillers.

In one embodiment, poly(styrene-block-SBO-block-styrene) (PS-PSBO-PS) or PS-PCSBO-PS is synthesized via RAFT.

The resulting PS-PSBO-PS or PS-PCSBO-PS polymer can contain ≈25 wt % polystyrene and be on the order of 100 kDa.

In one embodiment, PS-PSBO-PS polymers from above embodiment is blended with asphalt binders.

As the structure-property relationships for the PS-PSBO-PS system are built, composition and molecular weight ranges that should be best suited as bitumen modifiers can be identified from above embodiment.

Figure 3:
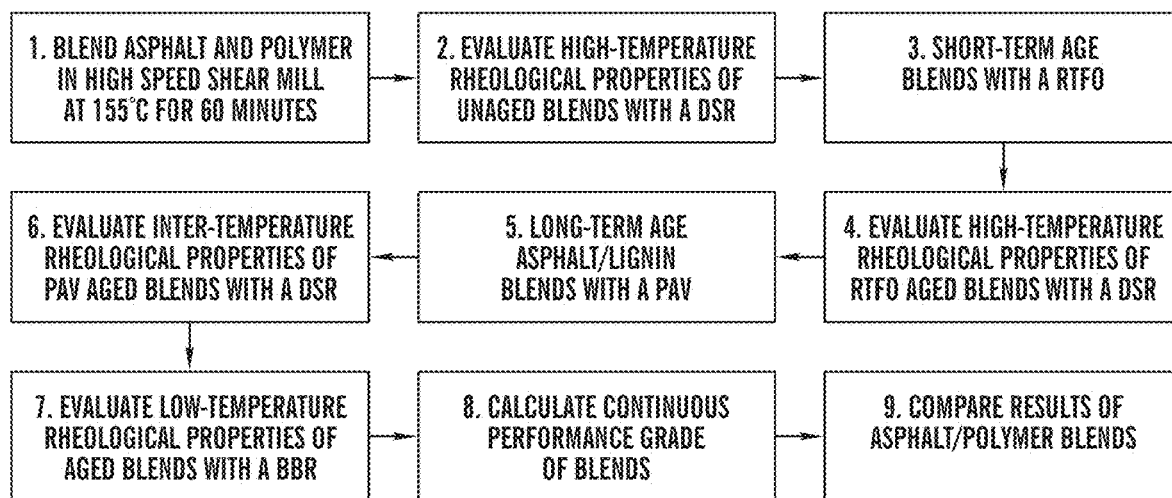
FIG. 3 is a flowchart showing the process of blending of poly(styrene-SBO-styrene) block copolymer compositions with asphalt binders and then testing their rheological properties.

The developed biopolymers are blended with two asphalts for subsequent testing. The asphalt binders used are derived from Canadian and Texas crude sources as they are commonly used in the United States. The biopolymers are blended at 3% by weight of the combined asphalt binder. A styrene-butadiene type polymer is used as a benchmark polymer for the subsequent techno-economic analysis. The blending and subsequent rheological testing is outlined in FIG. 3 and follows the American Association of State Highway and Transportation Officials (AASHTO) M 320 testing for determining the grade of an asphalt binder (AASHTO M 320: Standard Specification for Performance-graded Asphalt Binder. American Association of State Highway and Transportation Officials, Washington, D.C. (2002), which is hereby incorporated by reference in its entirety)

Frequency sweeps are carried out in a dynamic shear rheometer (DSR) and rotational viscometer (RV) at multiple temperatures. Bending beam rheometer testing is carried out at multiple temperatures. A rolling thin film oven (RTFO) and pressure aging vessel (PAV) are used to conduct simulated aging of the binder blends representing the aging of binders that occurs during production of asphalt mixtures and the in-situ aging, respectively.

These tests allow for understanding the effects of polymer content, effects of crude source, and the rheological behavior of the developed blends. Prior to rheological testing, separation testing is done to assess the ability of the polymers to meet American Society for Testing and Materials (ASTM) standards for maintaining homogeneity, ASTM D7173 utilizing a rotational viscometer (ASTM Standard C33: Standard Practice for Determining the Separation Tendency of Polymer from Polymer Modified Asphalt. ASTM International, West Conshohocken, Pa. (2003), which is hereby incorporated by reference in its entirety). Each test is conducted in triplicate on the same blends, which allows for analysis of variance (ANOVA) and subsequent regression analysis.

Statistical analysis of the data is performed utilizing the chemical and physical data of the biopolymers and the rheological properties. The analysis also includes ANOVA to identify independent variables that are significant, e.g. what variables effect the shear modulus of the binders derived from DSR testing. Once the significant variables are identified, regression analysis can be conducted utilizing the significant variables to identify interactions between variables and understand their relative magnitude/effect on the dependent variable. Additional analysis of the data includes development of binder master curves for comparison of rheological properties of the binders over a range of temperatures.

Another aspect of the present invention relates to a method of preparing a thermoplastic block copolymer. The method comprises providing a radically polymerizable monomer, represented by A, or a polymer block PA comprising one or more units of monomer A. A radically polymerizable triglyceride or mixture thereof, in the form of a plant oil, animal oil, or synthetic triglycerides, represented by B, is also provided. Monomer A or the polymer block PA is polymerized with monomer B via reversible addition-fragmentation chain-transfer polymerization (RAFT), in the presence of a free radical initiator and a chain transfer agent, to form the thermoplastic block copolymer. The polymerizing step is carried out under conditions effective to achieve a number average degree of polymerization ($N_n$) for the thermoplastic block copolymer of up to 100,000 without gelation.

The polymerizing step can be carried out by a) polymerizing monomer A via RAFT in a solvent suitable for dissolving the PA block; and b) polymerizing monomer B via RAFT in a solvent suitable for dissolving the PA block and a polymer block PB comprising one or more units of monomer B. The PA block from step a) acts as a macro chain transfer agent, which the monomer B can add onto, thus forming a diblock copolymer PA-PB. The resulting di-block copolymer PA-PB from step b) may be used as a macro chain transfer agent to c) further polymerize the di-block PA-PB with monomer A via RAFT. This adds an additional polymer block to the di-block copolymer PA-PB, forming a tri-block copolymer PA-PB-PA.

Step c) may be repeated multiple times, adding desired polymer block (either the PA or PB block), to form a desirable multiple block copolymer. For instance, a penta-block copolymer PA-PB-PA-PB-PA may be formed by repeating step c) three times, adding PA, PB and PA, in each step respectively, to the di-block copolymer PA-PB formed from step b).

Moreover, monomer A or monomer B in the polymering step c) can each independently be the same or different monomer than the monomer A or monomer B used in the polymerizing step a) or b). For instance, when adding a monomer A to the already formed di-block PA-PB to form a tri-block PA-PB-PA, this additional monomer A can be the same kind of monomer A unit used in the di-block (e.g., both are styrene), or a different kind (e.g., monomer unit A in di-block is styrene; and additional monomer A is methyl (meth)acrylate).

Using this method, by repeating step c) multiple times, and adding the desired polymer block each time, different block copolymer architectures may be achieved, for instance, multiple block copolymers having a $(PA-PB)_n$ architecture or $(PA-PB)_n$-PA architecture, where n is an integer of greater than 1, are produced; and each monomer A unit or monomer B unit in architecture may be the same or different When the chain transfer agent used at starting the polymerization is a telechelic chain transfer agent, the polymerizing step can be carried out by a) polymerizing monomer A via RAFT in a solvent suitable for dissolving the PA block with the telechelic chain transfer agent, thereby inserting the PA block within the telechelic chain transfer agent, yielding a symmetric polymer PA block with a trithiocarbonate linkage of the telechelic chain transfer agent in the center of the chain contour: PA-TCTA-PA (see Scheme 1); and b) polymerizing monomer B via RAFT in a solvent suitable for dissolving the PA block and a polymer block PB comprising one or more units of monomer B. TCTA is a moiety in the PA block, derived from the telechelic chain transfer agent, e.g., a trithiocarbonate moiety or any other moiety from a telechelic CTA agent used to produce the telechelic thermoplastic block copolymers. The PA block (i.e., the PA-TCTA-PA block) from step a) acts as a telechelic macro chain transfer agent, where the monomer B can symmetrically add into the interior of the PA block following the same mechanism shown in Scheme 1, thus forming a symmetrical triblock copolymer PA-PB-PA (i.e., PA-PB-TCTA-PB-PA). The resulting tri-block copolymer PA-PB-PA (PA-PB-TCTA-PB-PA) from step b) may be used as a telechelic macro chain transfer agent to c) further polymerize monomer A into the interior chain of the tri-block PA-PB-PA symmetrically via RAFT. This adds additional symmetrical polymer blocks to the interior of the tri-block copolymer, forming a penta-block copolymer PA-PB-PA-PB-PA, i.e. PA-PB-PA-TCTA-PA-PB-PA.

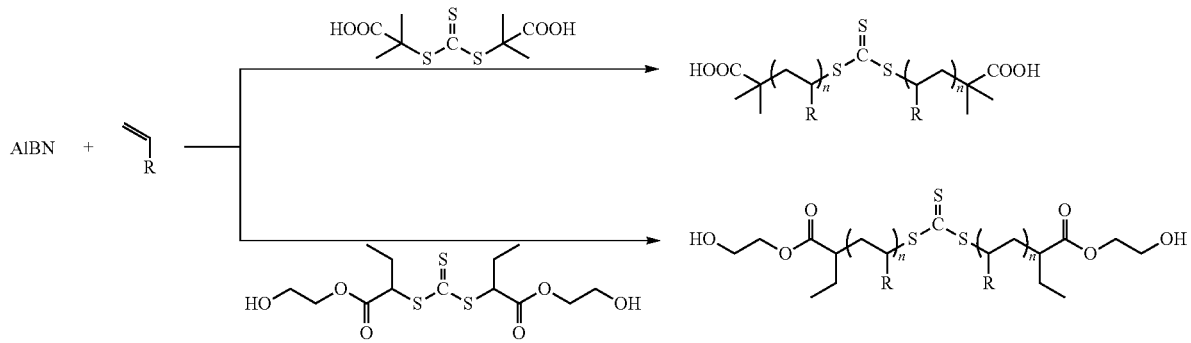

Scheme 1. Schematic showing of the basic mechanism of RAFT polymerization using a telechelic chain transfer agent. AIBN is an exemplary chain initiator, azobisisobutyronitrile; and

is an exemplary monomer unit, a vinyl monomer (Tasdelen et al., "Telechelic Polymers by Living and Controlled/Living Polymerization Methods," *Progress in Polymer Science* 36 (4), 455-567 (2011), which is hereby incorporated by reference in its entirety).

Moreover, monomer A or monomer B in the polymering step c) can each independently be the same or different monomer than the monomer A or monomer B used in the polymerizing step a) or b). For instance, when adding a monomer A to the already formed tri-block PA-PB-PA to form a penta-block PA-PB-PA-PB-PA, this additional monomer A can be the same kind of monomer A unit used in the tri-block (e.g., both are styrene), or a different kind (e.g., initially added monomer unit A in tri-block is styrene (S); and the additional monomer A is methyl(meth)acrylate (MMA), thereby forming PS-PB-PMMA-PB-PS).

Using this method, by repeating step c) multiple times, and adding the desired symmetrical polymer blocks each time, different block copolymer architectures may be achieved, for instance, multiple block copolymers having a $(PA-PB)_n$-PA architecture or PB-$(PA-PB)_n$ architecture, where n is an integer of greater than 2, are produced; and each monomer A unit or monomer B unit in the architecture may be the same or different.

Alternatively, the method of preparing a thermoplastic block copolymer comprises providing a radically polymerizable triglyceride or mixture thereof, in the form of a plant oil, animal oil, or synthetic triglycerides, represented by B, or a polymer block PB comprising one or more units of monomer B. A radically polymerizable monomer, represented by A, is also provided. Monomer B or the polymer block PB is polymerized with monomer A via RAFT, in the presence of a free radical initiator and a chain transfer agent, to form the thermoplastic block copolymer. The polymerizing step is carried out under conditions effective to achieve a number average degree of polymerization ($N_n$) for the thermoplastic block copolymer of up to 100,000 without gelation.

The polymerizing step can be carried out by a) polymerizing monomer B via RAFT in a solvent suitable for dissolving the PB block; and b) polymerizing monomer A via RAFT in a solvent suitable for dissolving a polymer block PA comprising one or more units of monomer A and the PB block. The PB block from step a) acts a macro chain transfer agent, which the monomer B can add onto, thus forming a diblock copolymer PB-PA. The resulting di-block copolymer PB-PA from step b) may be used as a macro chain transfer agent to c) further polymerize the di-block PB-PA with monomer B via RAFT. This adds an additional polymer block to the di-block copolymer PB-PA, forming a tri-block copolymer PB-PA-PB.

Step c) may be repeated multiple times, adding desired polymer block (either the PB or PA block), to form a desirable multiple block copolymer. For instance, a penta-block copolymer PB-PA-PB-PA-PB may be formed by repeating step c) three times, adding PB, PA, and PB, in each step respectively, to the di-block copolymer PB-PA formed from step b).

Moreover, monomer A or monomer B in the polymering step c) can each independently be the same or different monomer than the monomer A or monomer B used in the polymerizing step a) or b). For instance, when adding a monomer B to the already formed di-block PB-PA to form a tri-block PB-PA-PB, this additional monomer B can be the same kind of monomer B unit used in the di-block (e.g., both are soybean oil containing triglycerides with the same conjugation site and the same degree of conjugation), or a different kind (e.g., monomer unit B in di-block is soybean oil; and additional monomer B is a different type of plant oil or animal oil, or soybean oil having triglycerides with different conjugation site and different degree of conjugation).

Using this method, by repeating step c) multiple times, and adding the desired polymer block each time, different block copolymer architectures may be achieved, for instance, multiple block copolymers having a PB-(PA-PB)$_n$ architecture, where n is an integer of greater than 1, are produced; and each monomer A unit or monomer B unit in architecture may be the same or different.

When the chain transfer agent used at starting the polymerization is a telechelic chain transfer agent, the polymerizing step can be carried out by a) polymerizing monomer B via RAFT in a solvent suitable for dissolving the PB block with the telechelic chain transfer agent, thereby inserting the PA block within the telechelic chain transfer agent, yielding a symmetric polymer PB block with a trithiocarbonate linkage of the telechelic chain transfer agent in the center of the chain contour: PB-TCTA-PB (see Scheme 1); and b) polymerizing monomer A via RAFT in a solvent suitable for dissolving a polymer block PA comprising one or more units of monomer A and the PB block. TCTA is a moiety in the PB block, derived from the telechelic chain transfer agent, e.g., a trithiocarbonate moiety or any other moiety from a telechelic CTA agent used to produce the telechelic thermoplastic block copolymers. The PB block (i.e., the PB-TCTA-PB block) from step a) acts as a telechelic macro chain transfer agent, where the monomer A can symmetrically add into the interior of the PB block following the same mechanism shown in Scheme 1, thus forming a symmetrical triblock copolymer PB-PA-PB (i.e., PB-PA-TCTA-PA-PB). The resulting tri-block copolymer PB-PA-PB (PB-PA-TCTA-PA-PB) from step b) may be used as a telechelic macro chain transfer agent to c) further polymerize monomer B into the interior chain of the tri-block PB-PA-PB symmetrically via RAFT. This adds additional symmetrical polymer blocks into the interior of the tri-block copolymer, forming a penta-block copolymer PB-PA-PB-PA-PB, i.e., PB-PA-PB-TCTA-PB-PA-PB.

Moreover, monomer A or monomer B in the polymering step c) can each independently be the same or different monomer than the monomer A or monomer B used in the polymerizing step a) or b). For instance, when adding a monomer B to the already formed tri-block PB-PA-PB to form a penta-block PB-PA-PB-PA-PB, this additional monomer B can be the same kind of monomer B unit used in the tri-block (e.g., both are soybean oil containing triglycerides with the same conjugation site and the same degree of conjugation), or a different kind (e.g., initially added monomer unit B in tri-block is soybean oil (SBO); and the additional monomer B is a different type of plant oil, animal oil, or synthetic triglycerides; or triglycerides or triglyceride mixtures with different conjugation site and different degree of conjugation ($B_2$), thereby forming PSBO-PA-PB$_2$-PA-PSBO).

Using this method, by repeating step c) multiple times, and adding the desired symmetrical polymer blocks each time, different block copolymer architectures may be achieved, for instance, multiple block copolymers having a (PA-PB)$_n$-PA architecture or PB-(PA-PB)$_n$ architecture, where n is an integer of greater than 2, are produced; and each monomer A unit or monomer B unit in the architecture may be the same or different.

Another aspect of the present invention relates to a method of preparing a thermoplastic homopolymer. The method comprises providing a radically polymerizable triglyceride or mixture thereof, in the form of a plant oil, animal oil, or synthetic triglycerides. This triglyceride-based monomer is then polymerized via RAFT, in the presence of a free radical initiator and a chain transfer agent, to form the thermoplastic homopolymer. The polymerizing step is carried out under conditions effective to achieve a number average degree of polymerization ($N_n$) for the thermoplastic homopolymer of up to 100,000 without gelation. The embodiments for the starting material (polymerizable triglyceride or mixtures of triglycerides), the reaction agents, the reaction mechanism, and the reaction conditions and parameters are the same as those described for methods of preparing a thermoplastic block copolymer by using either a regular chain transfer agent or a telechelic chain transfer agent.

The resulting thermoplastic homopolymer can itself be used as a thermoplastic elastomer, and has the same monomer unit, structures, and characteristics as the PB block described in the embodiments for the thermoplastic block copolymers. Accordingly, this thermoplastic homopolymer can also be used as a polymer block, and can be further polymerized with other monomers or form a polymerized plan oil- or animal oil-based thermoplastic block copolymer.

Another aspect of the present invention relates to a method of preparing a thermoplastic statistical copolymer. The method comprises providing a radically polymerizable monomer, represented by A. A radically polymerizable triglyceride or mixture thereof, in the form of a plant oil, animal oil, or synthetic triglycerides, represented by B is also provided. Monomer A and monomer B are simultaneously polymerized, via RAFT, in the presence of a free radical initiator and a chain transfer agent to form the thermoplastic statistical copolymer. The polymerizing step is carried out under conditions effective to achieve a number average degree of polymerization ($N_n$) for the thermoplastic statistical copolymer of up to 100,000 without gelation.

The method can be used to simultaneously polymerize three or more different monomer units. For instance, another radically polymerizable monomer, represented by C can also be provided, in addition to monomer A and monomer C. Monomer C is different than monomer A or monomer B. Monomer A, monomer B, and monomer C are then polymerized simultaneously, via RAFT, in the presence of the free radical initiator and the chain transfer agent to form the thermoplastic statistical copolymer. The polymerizing step is carried out under conditions effective to achieve a number average degree of polymerization ($N_n$) for the thermoplastic statistical copolymer of up to 100,000 without gelation.

The polymerization of monomers A and B to form thermoplastic block copolymer or thermoplastic statistical copolymer is performed through living free radical polymerization which involves living/controlled polymerization with free radical as the active polymer chain end (Moad et al., "The Chemistry of Radical Polymerization—Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. One form of living free radical polymerization is Radical Addition-Fragmentation Chain Transfer (RAFT).

Radical Addition-Fragmentation Chain Transfer (RAFT) polymerization is a type of living polymerization or controlled polymerization, utilizing a chain transfer agent (CTA). Conventional RAFT polymerization mechanism, consisting of a sequence of addition-fragmentation equilibria, is shown in FIG. 1 (Moad et al., "Living Radical Polymerization by the Raft Process—a First Update," *Australian Journal of Chemistry* 59: 669-92 (2006), which is incorporated herein by reference in its entirety). As shown in FIG. 1, the RAFT polymerization reaction starts with initiation. Initiation is accomplished by adding an agent capable of decomposing to form free radicals; the decomposed free radical fragment of the initiator attacks a monomer yielding a propagating radical ($P_n$), in which additional monomers are added producing a growing polymer chain. In the propagation step, the propagating radical ($P_n$) adds to a chain transfer agent (CTA), such as a thiocarbonylthio compound (RSC(Z)=S, 1), followed by the fragmentation of the intermediate radical (2) forming a dormant polymer chain with a thiocarbonylthio ending ($P_nS(Z)C=S$, 3) and a new radical (R.). This radical (R.) reacts with a new monomer molecule forming a new propagating radical ($P_m$). In the chain propagation step, ($P_n$) and ($P_m$) reach equilibrium and the dormant polymer chain (3) provides an equal probability to all polymers chains to grow at the same rate, allowing polymers to be synthesized with narrow polydispersity. Termination is limited in RAFT, and, if occurring, is negligible. Targeting a specific molecular weight in RAFT can be calculated by multiplying the ratio of monomer consumed to the concentration of CTA used by the molecular weight of the monomer.

The initiating agents often are referred to as "initiators." Suitable initiators depend greatly on the details of the polymerization, including the types of monomers being used, the type of catalyst system, the solvent system, and the reaction conditions. A typical radical initiator can be azo compounds, which provide a two-carbon centered radical. Radical initiators such as benzoyl peroxide, azobisisobutyronitrile (AIBN), 1,1' azobis(cyclohexanecarbonitrile) or (ABCN), or 4,4'-Azobis(4-cyanovaleric acid) (ACVA); redox initiator such as benzoyl peroxide/N,N-dimethylaniline; microwave heating initiator; photoinitiator such as (2,4,6-trimethylbenzoyl)-diphenylphosphine oxide; gamma radiation initiator; or lewis acids such as scandium(III) triflate or yttrium (III) triflate, are typically used in RAFT polymerization.

RAFT polymerization can use a wide variety of CTA agents. Suitable CTA agents should be capable of initiating the polymerization of the monomers (styrene and AESO) and achieve a narrow polydispersity in the process. For a RAFT polymerization to be efficient, the initial CTA agents and the polymer RAFT agent should have a reactive C=S double bond; the intermediate radical should fragment rapidly without side reactions; the intermediate should partition in favor of products, and the expelled radicals (R.) should efficiently re-initiate polymerization. Suitable CTA agent is typically a thiocarbonylthio compound (ZC(=S)SR:

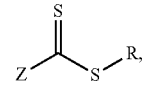

where R is free radical leaving group and Z is a group that modifies addition and fragmentation rates of RAFT polymerization. Exemplary CTA agents include, but are not limited to, a dithioester compound (where Z=aryl, heteraryl, or alkyl), a trithiocarbonate compound (where Z=alkylthio, arylthio, or heteroarylthio), a dithiocarbamate compound (where Z=arylamine or heterarylamine or alkylamine), and a xanthate compound (where Z=alkoxy, aryloxy, or heteroaryloxy), that are capable or reversible association with polymerizable free radicals. Z can also be sulfonyl, phosphonate, or phosphine. A more extensive list of suitable CTA agents (or RAFT agents) can be found in Moad et al., "Living Radical Polymerization by the Raft Process—a First Update," *Australian Journal of Chemistry* 59: 669-92 (2006); Moad et al., "Living Radical Polymerization by the Raft Process-a Second Update," *Australian Journal of Chemistry* 62(11):1402-72 (2009); Moad et al., "Living Radical Polymerization by the Raft Process—a Third Update," *Australian Journal of Chemistry* 65: 985-1076 (2012); Skey et al., "Facile one pot synthesis of a range of reversible addition-fragmentation chain transfer (RAFT) agents." *Chemical Communications* 35: 4183-85 (2008), which are hereby incorporated by reference in their entirety. Effectiveness of the CTA agent depends on the monomer being used and is determined by the properties of the free radical leaving group R and the Z group. These groups activate and deactivate the thiocarbonyl double bond of the RAFT agent and modify the stability of the intermediate radicals (Moad et al., "Living Radical Polymerization by the Raft Process—a Second Update," *Australian Journal of Chemistry* 62(11):1402-72 (2009), which is hereby incorporated by reference in its entirety). Typical CTA agents used are 1-phenylethyl benzodithioate or 1-phenylethyl 2-phenylpropanedithioate.

In one embodiment, the chain transfer agent used is a telechelic chain transfer agent, which typically is based on trithiocarbonate functionality. Polymers produced from the chain transfer agent based on trithiocarbonate functional group retain the CTA functionality in the statistical center of the chain, as opposed to polymers produced by a dithiocarbonate-based CTA, which retain the CTA functionality at the end of the polymeric chain. The telechelic chain transfer agent is capable of adding polymer blocks symmetrically from the interior where the trithiocarbonate functionality is located, i.e., polymerizing monomers from both ends, forming symmetrical architecture or polymer blocks. For example, the RAFT process begins with the chain transfer of a growing A radical to a functional trithiocarbonate:

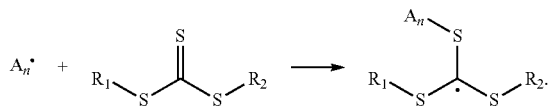

The formed radical intermediate is stable against coupling or disproportion reactions with other free radicals. One of the thioate groups reversibly fragments allowing propagation of one of the three arms:

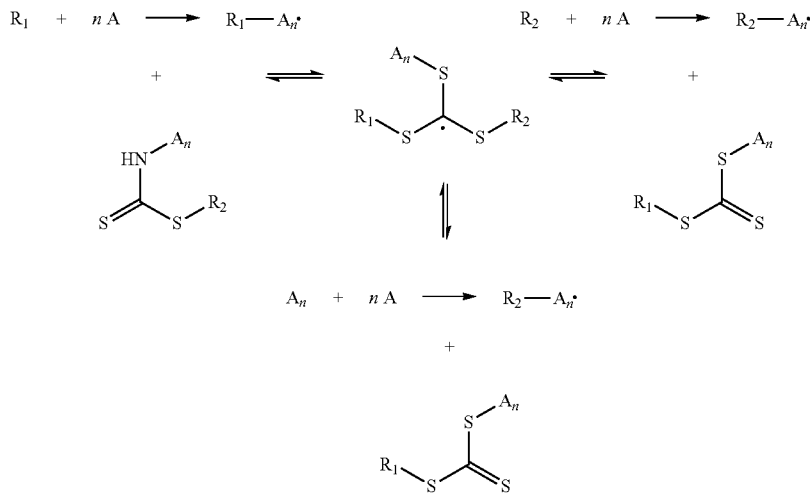

See also Scheme 1 for the basic mechanism of RAFT polymerization using a telechelic chain transfer agent. Suitable telechelic CTA agents include any trithiocarbonate compound

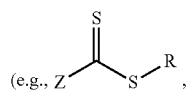

where Z=alkylthio, arylthio, or heteroarylthio and R is free radical leaving group). A more extensive list of suitable telechelic CTA agents (trithiocarbonate compounds) can be found in Skey et al., "Facile one pot synthesis of a range of reversible addition-fragmentation chain transfer (RAFT) agents." *Chemical Communications* 35: 4183-85 (2008), which is hereby incorporated by reference in its entirety. A typical telechelic chain transfer agent is dibenzyl carbonotrithioate

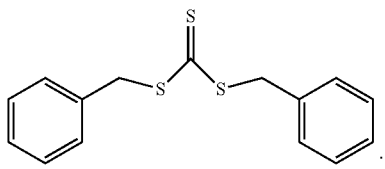 [SMILES: S=C(SCc1ccccc1)SCc1ccccc1]

The radically polymerizable monomers used in this method include, but are not limited to, a vinyl, acrylic, diolefin, nitrile, dinitrile, acrylonitrile monomer, a monomer with reactive functionality, a crosslinking monomer, and mixtures thereof. The exemplary embodiments for the monomer A in accordance with the method of the present invention have been described above in the exemplary embodiments for the monomer A in the thermoplastic block copolymer. Exemplary radically polymerizable monomers A used in this method are styrene, α-methyl styrene, t-butyl styrene, vinyl xylene, vinyl naphthalene, vinyl pyridine, divinyl benzene, vinyl acetate, N-vinylpyrrolidone, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, or mixtures thereof. In one embodiment, the polymerizable vinyl monomer A is a vinyl aromatic monomer, for instance, a styrene. In one embodiment, the polymerizable monomer A is an acrylate monomer, for instance, a methyl (meth)acrylate.

The radically polymerizable plant oil monomers or animal oil monomers used in this method include, but are not limited to, the monomer from vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Exemplary plant oils used in the method are soybean oil, corn oil, linseed oil, flax seed oil, or rapeseed oil. In one embodiment, the polymerized plant oil monomer is poly(soybean oil). Suitable animal fats used in accordance with the present invention include, but are not limited to, beef or mutton fat such as beef tallow or mutton tallow, pork fat such as pork lard, poultry fat such as turkey and/or chicken fat, and fish fat/oil. The animal fats can be obtained from any suitable source including restaurants and meat production facilities. The triglyceride in the plant oil or animal oil can comprise one or more conjugated sites, as described above. In one embodiment, the triglyceride is an acrylated epoxidized triglyceride.

Accordingly, in one embodiment, the present invention relates to methods of making a thermoplastic and elastomeric block copolymer having a poly(styrene-soybean oil) (PS-PSBO) diblock copolymer architecture or a poly(styrene-soybean oil-styrene) (PS-PSBO-PS) triblock polymer architecture, via RAFT reaction. The method comprises the following steps: a) RAFT polymerization of styrene homopolymer (PS), to reach a molecular weight of 1 to 1000 kDa, 1 to 300 kDa, or 10 to 30 kDa, optionally followed by purification; b) RAFT polymerization of SBO or CSBO using PS as a macro chain transfer agent, in a solvent suitable for the mutual dissolution of PS and polySBO or polyCSBO, to yield the diblock copolymer PS-PSBO or PS-PCSBO having a molecular weight of 5 to 10,000 kDa, 5 to 500 kDa, 15 to 300 kDa, 40 to 100 kDa, or 80 to 100 kDa; and c) optionally RAFT polymerization of styrene using PS-PSBO or PS-PCSBO as the macrochain transfer agent, to yield triblock copolymer PS-PSBO-PS or PS-PCSBO-PS having a molecular weight of 7 to 10,000 kDa, 7 to 1000 kDa, 7 to 500 kDa, 15 to 350 kDa, 80 to 120 kDa or 100 to 120 kDa.

Alternatively, the method of the present invention may comprise the following steps: a) RAFT polymerization of SBO or CSBO to reach a molecular weight of 1 to 1000 kDa, 1 to 300 kDa, or 10 to 30 kDa, optionally followed by purification; b) RAFT polymerization of styrene homopolymer (PS), using PSBO or PCSBO as a macrochain transfer agent, in a solvent suitable for the mutual dissolution of PS and PSBO or PCSBO, to yield the diblock copolymer PS-PSBO or PS-PCSBO having a molecular weight of 5 to 10,000 kDa, 5 to 500 kDa, 15 to 300 kDa, 40 to 100 kDa, or 80 to 100 kDa; and c) optionally RAFT polymerization of styrene to the end of PSBO or PCSBO using PS-PSBO or PS-PCSBO as the macrochain transfer agent, to yield triblock copolymer PS-PSBO-PS or PS-PCSBO-PS having a molecular weight of 7 to 10,000 kDa, 7 to 1000 kDa, 7 to 500 kDa, 15 to 350 kDa, 80 to 120 kDa or 100 to 120 kDa.

In one embodiment, the method of the present invention may also comprise the following steps: a) RAFT polymerization of styrene homopolymer using a telechelic chain transfer agent to reach a molecular weight of 1 to 1000 kDa, 1 to 300 kDa, or 10 to 30 kDa, optionally followed by purification; b) RAFT polymerization of PSBO or PCSBO, using the styrene homopolymer (PS) as the macro chain transfer agent, in a solvent suitable for the mutual dissolution of PS and PSBO or PCSBO, to yield a triblock PS-PSBO-PS or PS-PCSBO-PS having a molecular weight of 7 to 10,000 kDa, 7 to 1000 kDa, 7 to 500 kDa, 15 to 350 kDa, 80 to 120 kDa or 100 to 120 kDa.

A typical conjugated plant oil or animal oil used in accordance with the method of the present invention is acrylated epoxidized plant oil or animal oil, such as acrylated epoxidized soybean oil, which contains one or more acrylated epoxidized triglycerides.

In RAFT polymerization, reaction time, temperature, and solvent concentration should be chosen appropriately to ensure the production of non-crosslinked thermoplastic elastomers. Reaction time relates closely to the temperature the reaction is carried out at: higher temperature requires shorter reaction times and lower temperature requires longer reaction times. Monitoring the time of the polymerization of the AESO block is crucial as reacting the vegetable oil too long causes the polymer to crosslink; whereas reacting the vegetable oil for too short a time period causes polymer conversion to be too slow. Temperatures for the RAFT polymerization on plant oil or animal oil reaction can range from room temperature to up to 180° C.

A RAFT reaction of styrene and soybean oil to prepare thermoplastic elastomers, polymerization can be carried out at a temperature of 200° C. or lower. The optimal temperature is the minimum at which polymerization can occur over reasonable time scales, e.g., 6-48 hours. In a RAFT reaction of SBO or CSBO to make PSBO- or PCSBO-based thermoplastic elastomers, it is desirable to produce PSBO or PCSBO with high molecular weight and low glass transition temperature ($T_g$), and with the retention of the terminal halogen, which allows the subsequent addition of a polystyrene block. Thus, high reaction temperatures as in conventional radical polymerizations are undesirable in a RAFT reaction involving SBO or CSBO. Typical reaction temperatures for a RAFT reaction between styrene and soybean oil is 150° C. or lower, for instance, from 0 to 150° C., from 40° C. to 150° C., from 80° C. to 150° C., from 40° C. to 100° C., from 50° C. to 85° C., or from 0° C. to 50° C.

In a conventional RAFT polymerization process, a N: 1 molar ratio (monomer to CTA ratio) would yield polymers with an average of N repeat units where the ratio of monomer to CTA agent usually goes from 1000:1 down to 1:1. In the RAFT reaction of plant oil or animal oil of the present intention, however, a 10:1 molar ratio of monomer to CTA is used, to obtain a thermoplastic elastomer. This monomer to CTA ratio represents an excess of CTA compared to a conventional RAFT synthesis. In AESO polymerization, however, the multifunctional character of the monomer tends towards crosslinking. This crosslinking can be mitigated by the use of excess CTA.

In one embodiment, RAFT polymerization is carried out at a molar ratio of the chain transfer agent to the monomer ranging from 1:1 to 50:1.

Solvent is selected based the requirements of mutual polySBO/polystyrene solubility and a normal boiling point compatible with the polymerization temperature. The solvent used in the RAFT polymerization of styrene and soybean oil may be toluene, dioxane, THF, chloroform, cyclohexane, dimethyl sulfoxide, dimethyl formamide, acetone, acetonitrile, n-butanol, n-pentanol, chlorobenzene, dichloromethane, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, or a mixture thereof. The typical solvent used for ATRP of styrene and soybean oil is dioxane. Monomer concentrations in the reactions depend partially on the solubility of the monomer and the polymer products as well as the evaporation temperature of the solvent. Solvent concentration can affect the gelation of the polymer. In conventional RAFT, monomer concentration in solvent during polymerizations can range from 100 wt % (no solvent) to 33.3 wt %. However, insufficient solvent in the RAFT reaction can cause the polymer to crosslink in a shorter time period without ever reaching high enough conversions. Therefore, solvent is typically added in excess to allow the polymer chains to grow and obtain a conversion rate to 80% without risk of the polymer reaching the gel point. The concentration of monomers dissolved in the solvent in the RAFT reactions may range from 5% to 100% weight percentage monomer. Typically, a monomer concentration of less than 40% by mass is suitable to ensure the solubility of the resulting polymers and additionally to prevent premature gelation.

In one embodiment, the method is carried out in the presence of a solvent, at a temperature ranging from 50 to 85° C. The monomer B concentration in the solvent can range from 5% to 100 wt %, for instance, from 10% to 40 wt %.

After the radical polymerization, the polymerized plant oil- or animal oil-based block copolymer may be further catalytically hydrogenated to partially or fully saturate the plant oil block or animal oil block. This process removes reactive unsaturation from the rubbery component, yielding improved resistance to oxidative degradation, reduced cross-linkability and increased resistance to chemical attack. Moreover, hydrogenation precludes gelation on subsequent block additions.

RAFT experiments can be carried out by varying the following parameters.

Temperature

Conventional free radical polymerization (CFRP) of CSBO has been reported at temperatures ranging from 60-150° C. In CFRP, the temperature dependence on polymerization kinetics is dominated by the decomposition reaction of the initiator. The trade-off of the high temperature is a higher polymerization rate with lower molecular weight and increased chain transfer reactions. Increasing chain transfer reaction is desirable in the production of thermoset polymers, where the polySBO eventually gels and solidifies as chains begin to crosslink (Valverde et al., "Conjugated Low-Saturation Soybean Oil Thermosets: Free-Radical Copolymerization with Dicyclopentadiene and Divinylbenzene," *Journal of Applied Polymer Science* 107:423-430 (2008); Robertson et al., "Toughening of Polylactide with Polymerized Soybean Oil," *Macromolecules* 43:1807-1814 (2010), which are hereby incorporated by reference in their entirety).

For the method of preparing CSBO-based thermoplastic elastomers, the optimal temperature is the minimum at which polymerization can occur over reasonable time scales, e.g., 1-48 hours. In contrast to conventional free radical polymerization, the primary role of temperature in a RAFT reaction is to shift the equilibrium towards higher free radical concentration and to increase the propagation rate. These are desirable to a certain extent; however, as the free radical concentration increases so does the rate of termination and transfer reactions. In RAFT of CSBO to make PCSBO-based thermoplastic elastomers, it is desirable to produce PCSBO with a high molecular weight and a low glass transition temperature ($T_g$), and with the retention of the terminal halogen, which allow the subsequent addition of a polystyrene block. Thus, the increased rate of termination and transfer reactions (i.e., high reaction temperature) are undesirable in ATRP of CSBO.

Solvent

Bulk polymerization is the starting point as the solvent directly places limits on the polymerization temperature and also influences the RAFT equilibrium. The synthesis of polySBO from a polystyrene macroinitiator requires a solvent. Solvent is selected based the requirements of mutual polySBO/polystyrene solubility and a normal boiling point compatible with the polymerization temperature.

Time

Reactions are allowed to progress for 12 hours, and gel permeation chromatography is used to assess the degree of polymerization. The polymerization kinetics are subsequently assessed and the parameters are fine-tuned such that polySBO compounds can be reproducibly made with minimal polydispersity and of targeted molecular weight. Differential scanning calorimetry is used to assess the $T_g$ of the polySBO materials, which is expected to be on the order of −50° C. (Yang et al., "Conjugation of Soybean Oil and It's Free-Radical Copolymerization with Acrylonitrile," *Journal of Polymers and the Environment* 1-7 (2010); Robertson et al., "Toughening of Polylactide with Polymerized Soybean Oil," *Macromolecules* 43:1807-1814 (2010), which are hereby incorporated by reference in their entirety).

EXAMPLES

The following examples are for illustrative purposes only and are not intended to limit, in any way, the scope of the present invention.

Example 1—Synthesis of Poly(Styrene) (PS), Poly (Acrylated Epoxidized Soybean Oil) (PAESO), Poly(Acrylated Epoxidized Soybean Oil-Block-Styrene) (PAESO-PS), and Poly(Styrene-Block-Acrylated Epoxidized Soybean Oil-Block-Styrene) (PS-PAESO-PS) Via Reversible Addition-Fragmentation Chain Transfer Polymerization (RAFT)

Figure 4:
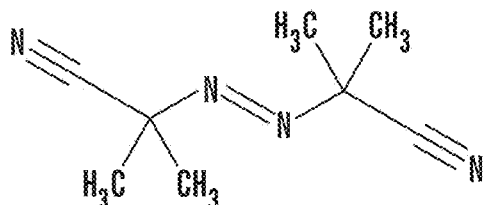
FIG. 4 shows the chemical structure of azobisisobutyronitrile (AIBN).
Figure 5:
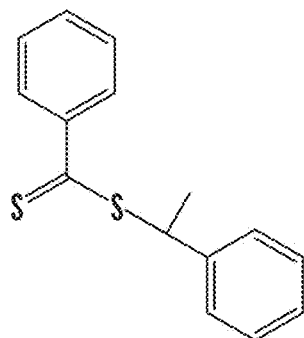
FIG. 5 shows the chemical structure of 1-phenylethyl benzodithioate.

Acrylated Epoxidized Soy Bean Oil (AESO) was purchased from Fisher Scientific and was used as received. High-performance liquid chromatography (HPLC)-grade toluene was purchased from Fisher Scientific and used without further purification. Styrene was purchased from Fisher Scientific and purified over basic alumina followed by three freeze-pump-thaw cycles. RAFT synthesis was performed in a similar manner to the procedure described in Moad et al., "Living Radical Polymerization by the Raft Process—a First Update," *Australian Journal of Chemistry* 59: 669-92 (2006); Moad et al., "Living Radical Polymerization by the Raft Process—a Second Update," *Australian Journal of Chemistry* 62(11): 1402-72 (2009), which are hereby incorporated by reference in their entirety. Briefly, azobisisobutyronitrile (AIBN, as shown in FIG. 4) was used as the initiator. 1-phenylethyl benzodithioate (as shown in FIG. 5) was used as the chain transfer agent (CTA), and was synthesized according to established procedures.

Figure 6:
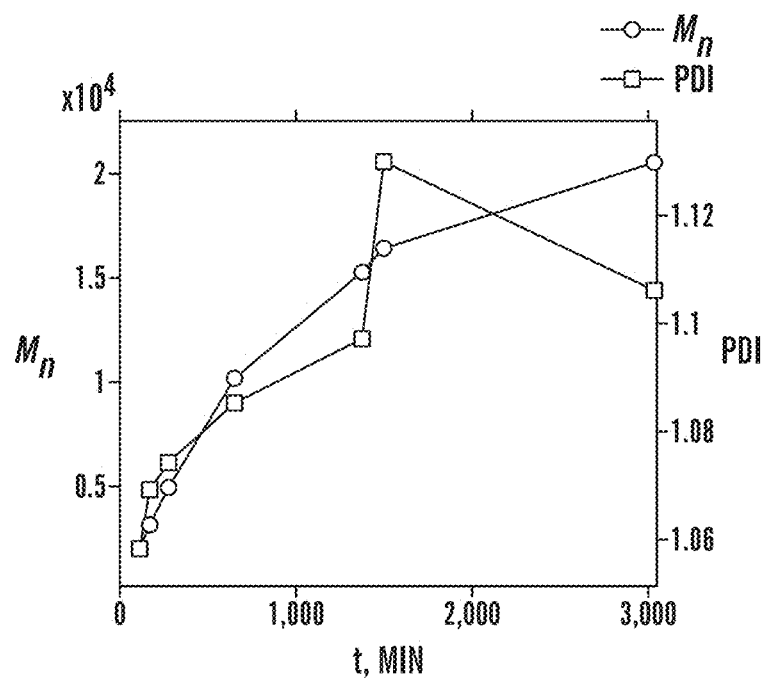
FIG. 6 is a graph showing the molecular weight (number average) increase of a styrene homopolymer as a function of time.

Reversible Addition-Fragmentation Chain Transfer Polymerization (RAFT) of Styrene Monomer (styrene), initiator, CTA, and solvent were mixed under argon in a round-bottomed flask with various mass ratios of monomer: solvent, 1:5 molar ratio of initiator to CTA, and 10:1 molar ratio of monomer to CTA. The reaction flask was bubbled with argon for 30 minutes to remove oxygen from the system before the temperature was increased. The reaction was run at 100° C. and the reaction time varied according the desired molecular weight (Mn). The molecular weight (number average) increase of the styrene homopolymer as a function of time is shown in FIG. 6.

RAFT of Acrylated Epoxidized Soybean Oil

Monomer (AESO), initiator, CTA, and solvent (1,2-dioxane) were mixed under argon in a 100 mL round-bottomed flask with various mass ratios of monomer: solvent, 1:5 molar ratio of initiator to CTA, and 10:1 molar ratio of monomer to CTA. This monomer to CTA ratio represents an excess of CTA compared to a typical RAFT synthesis. In a typical RAFT reaction, a N: 1 ratio would yield polymers with an average of N repeat units. In RAFT polymerization of AESO, however, the multifunctional character of the AESO monomer tends to crosslink, which is mitigated by the use of excess CTA, as described herein. The reaction flask was bubbled with argon for 30 minutes to remove oxygen from the system before the temperature was increased. The reaction was run at 70° C. and the reaction time varied according the desired molecular weight (Mn).

Synthesis of P(Styrene-B-AESO)

Figure 7:
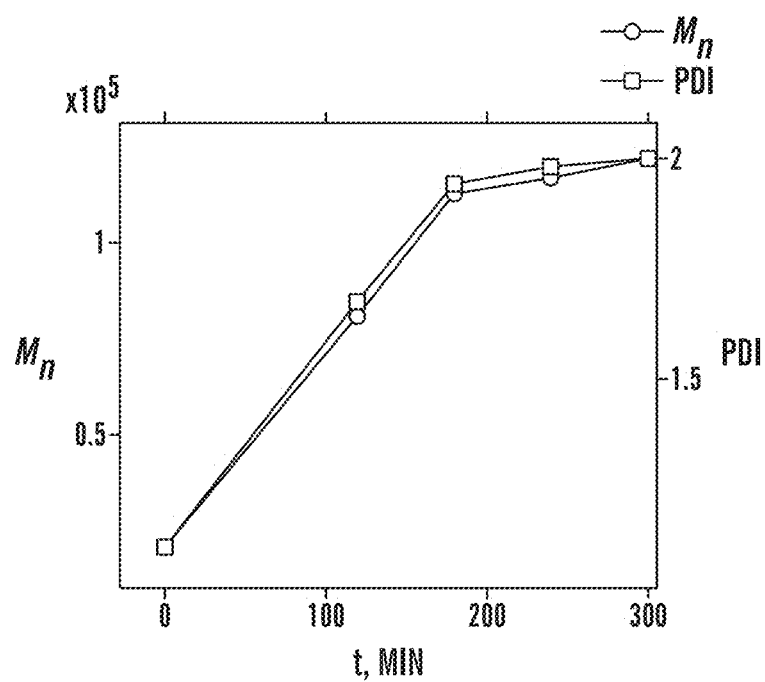
FIG. 7 is a graph showing the molecular weight (number average) increase of a poly(styrene-b-AESO) diblock copolymer as a function of time.
Figure 8:
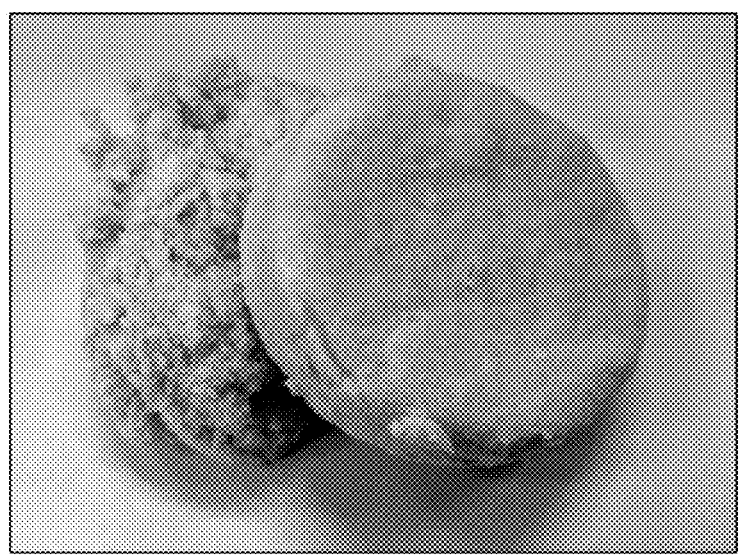
FIG. 8 is a photographic image showing a 130,000 kD/mol poly(styrene-b-AESO) diblock.
Figure 9:
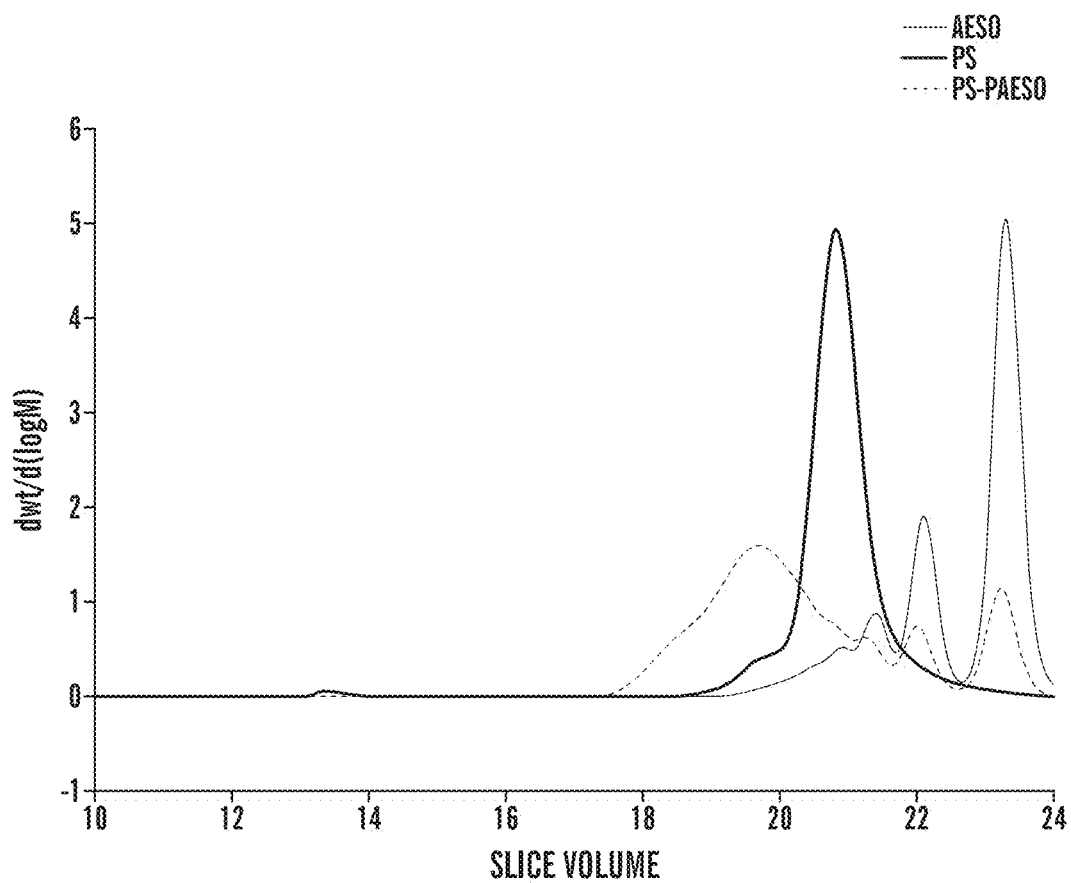
FIG. 9 is a graph showing an increase in molecular weight from a monomer, to a homopolymer, and to a diblock copolymer.

For synthesis of P(styrene-b-AESO), AESO monomer dissolved in toluene (or dioxane) was transferred to the reaction vessel containing the styrene homopolymer. The reaction proceeded for 5-6 hours, and the product was cooled down and precipitated three times in excess methanol and water. Mn was monitored as a function of time for the diblock copolymer (FIG. 7). The product was stirred in a 2:1 volume ratio of methanol to ethanol solution to remove unreacted AESO monomer. The final product (FIG. 8) was vacuum dried for 24 hours at room temperature. FIG. 9 shows the increase in molecular weight from the monomer to the homopolymer, and to the diblock copolymer.

Synthesis of P(Styrene-B-AESO-B-Styrene)

Figure 10:
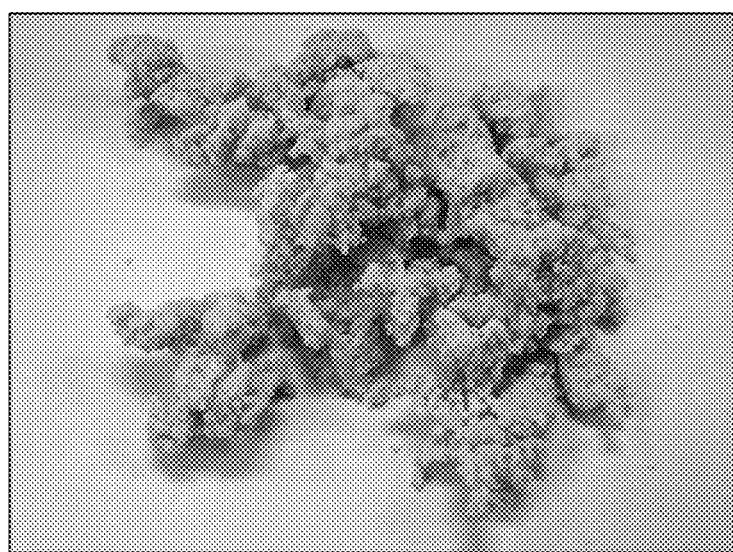
FIG. 10 is a photographic image showing a poly(styrene-b-AESO-styrene) triblock after 24 hours in the vacuum oven.

For P(styrene-b-AESO-b-styrene), the P(styrene-b-AESO) diblock was redissolved in toluene (or dioxane), styrene, and AIBN. The reaction vessel was bubbled with argon for 1 hour and the reaction proceeded for 1-2 hours at 70° C. The final product was precipitated two times in excess methanol and water. The product was then stirred in a 2:1 volume ratio of methanol to ethanol solution for 15 minutes to remove the unreacted AESO monomer. The product was filtered and vacuum dried at room temperature for 24 hours (FIG. 10).

Reaction Time

RAFT reaction times were varied according the desired molecular weight Mn. See FIG. 7. Most reactions were stopped after 24 hours. Mn of poly(styrene-b-AESO) was also monitored as a function of time, as shown in FIG. 6. FIG. 9 shows the gel permeation chromatography (GPC) curve, in which a decrease in elution time (increase in molecular weight) from the monomer, to homopolymer, to the diblock can be seen. After the addition of the final styrene block, the final product p(styrene-b-AESO-b-styrene) was subjected to different characterization techniques.

Figure 11:
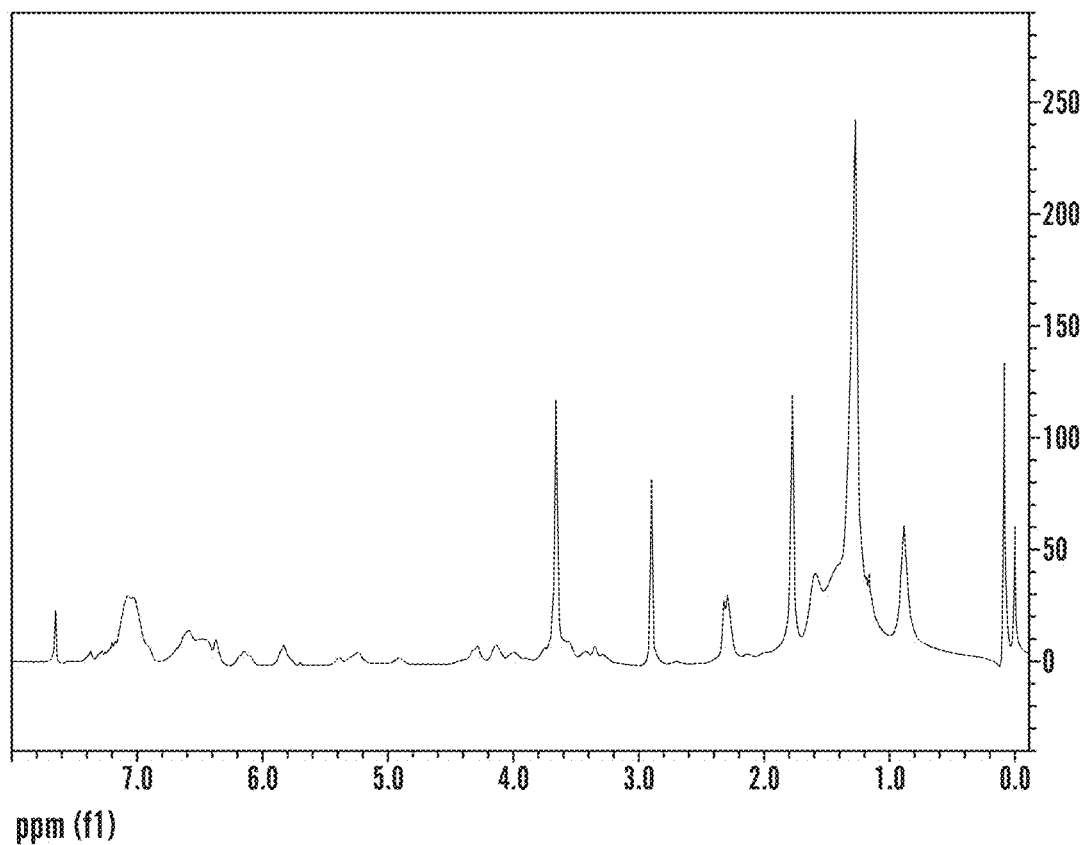
FIG. 11 is a graph showing the nuclear magnetic resonance (NMR) spectra of the poly(styrene-b-AESO-styrene) triblock.

Characterizations of the Polymers $^1$H-NMR was performed to prove the presence of polystyrene and to show the percentage of polystyrene in the product. The results show a 22.4% styrene content in the product. See FIG. 11.

Figure 12:
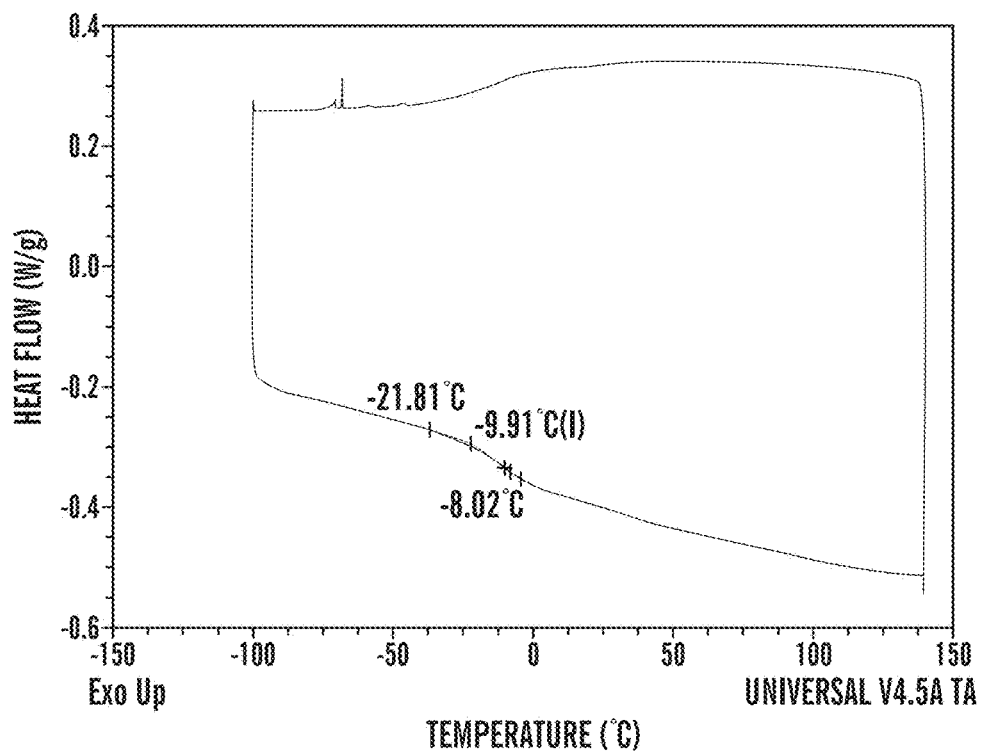
FIG. 12 is a graph showing the results of differential scanning calorimetry (DSC) of a PS-PAESO-PS sample. A glass transition temperature is shown in the graph at −10° C.; no apparent glass transition is present for the PS block.
Figure 13:
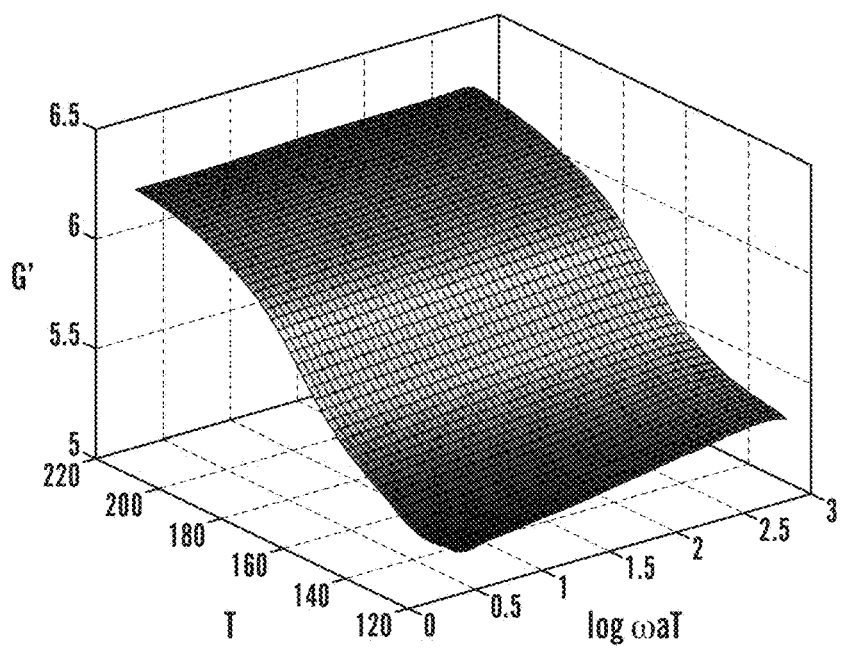
FIG. 13 is a graph showing the rheology curve of a PS-PAESO-PS sample.

Differential scanning calorimetry (DSC) showed a glass transition temperature for the PAESO at −10° C.; no apparent glass transition is present for the polystyrene block. See FIG. 12, Isothermal frequency scans with a frequency ranging 0.1-100 rad/s were conducted within the linear viscoelastic regime using a strain of 2.5%. The initial temperature was set to 120° C., and the final temperature was set to 220° C. Temperature was changed in 20° C. decrements, allowing 3 minutes as an equilibration time. The elastic modulus, G", shows no apparent change with change in frequency or temperatures below about 200° C. The rheology result is shown in FIG. 13.

Figure 14:
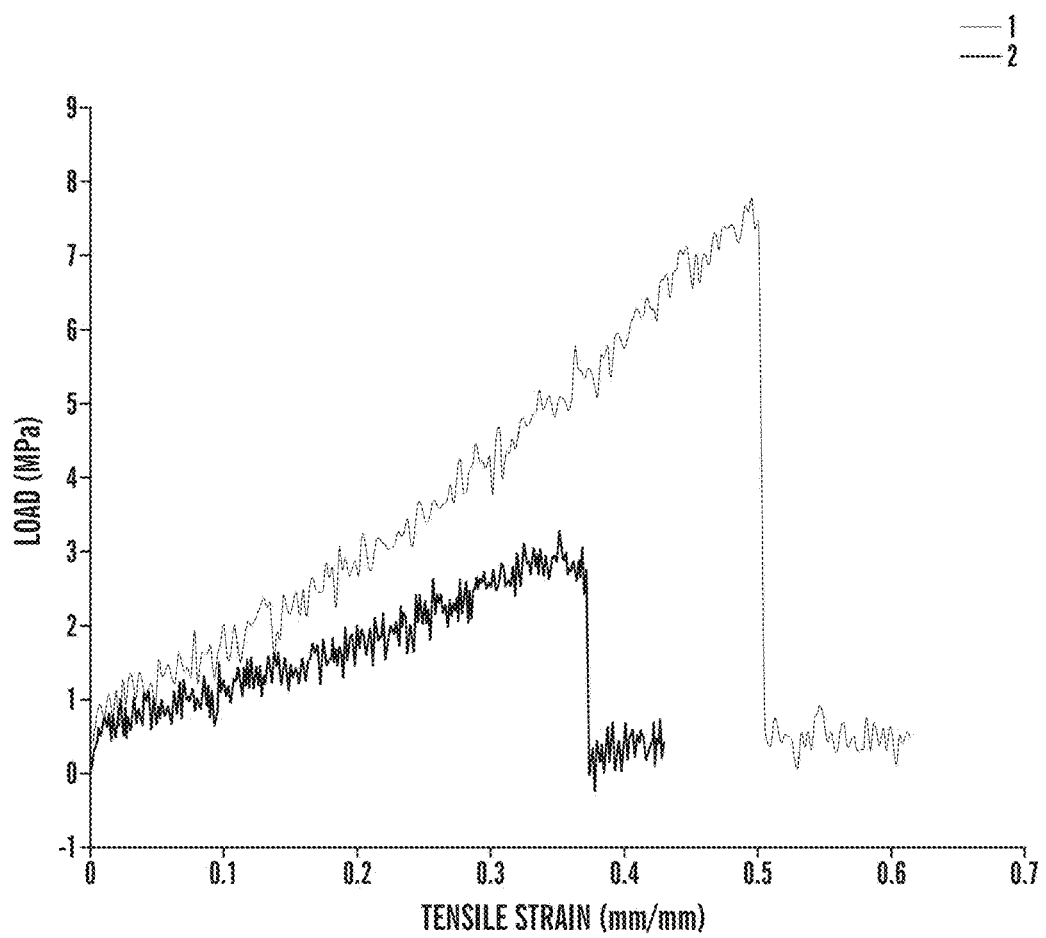
FIG. 14 is a graph showing the results of the tensile test of a poly(styrene-b-AESO-styrene) triblock copolymer: the load (MPa) versus tensile strain (mm/mm).
Figure 15:
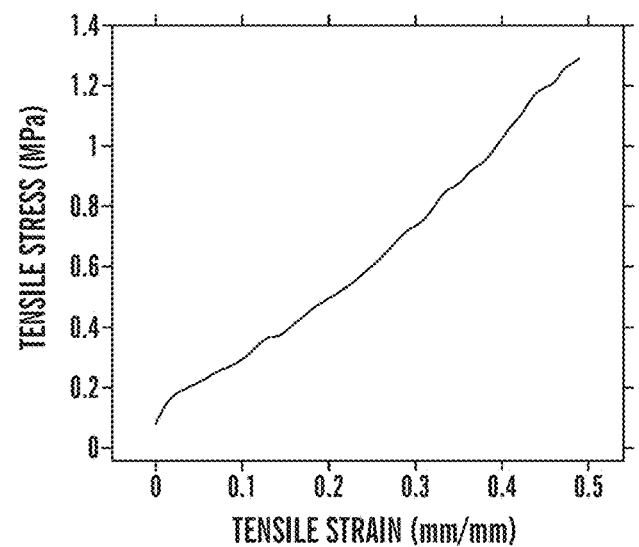
FIG. 15 is a graph showing the stress versus % strain curves for a RAFT synthesized PS-PAESO-PS triblock copolymer continued loading (gray) to find the maximum stress.

Tensile testing was performed in an Instron 5569 using a speed of 60 mm/minute (FIG. 14). The results show that the maximum stress that can be applied to the RAFT synthesized triblock copolymer was about 1.3 MPa (FIG. 15).

Figure 16:
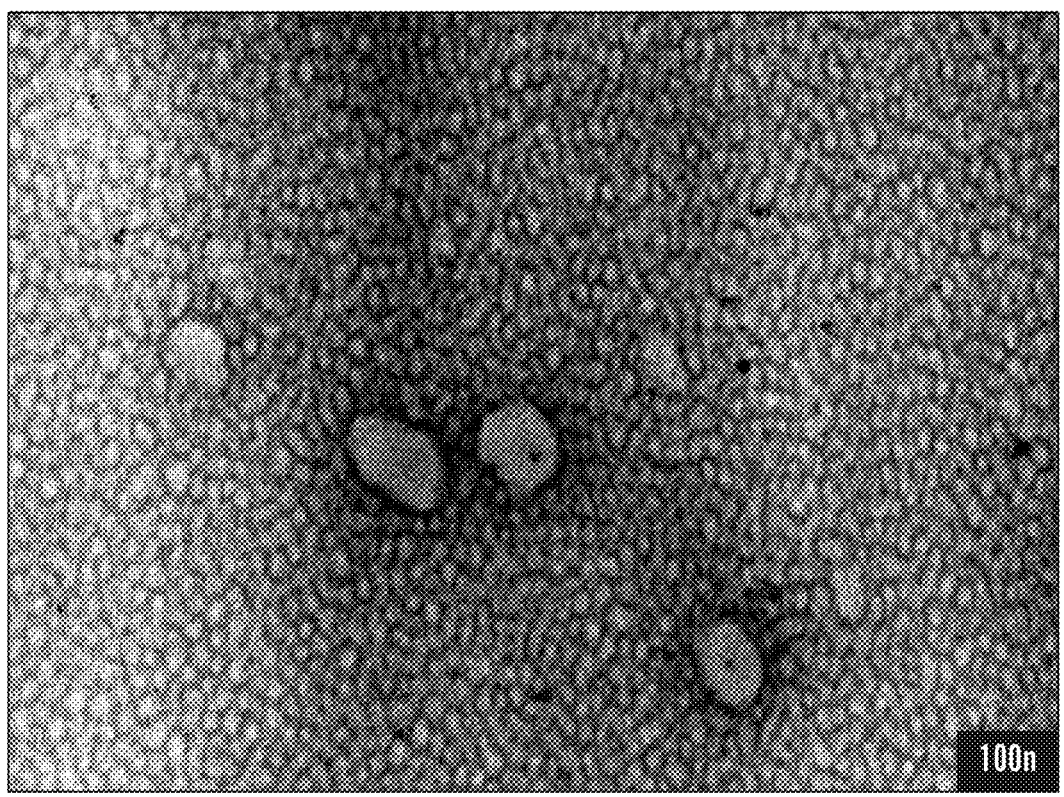
FIG. 16 is a TEM image of the PS-PAESO-PS #1 sample, listed in Table 2. The image shows a semi-ordered structure where the black islands are the styrene blocks and the lighter regions are the AESO blocks.
Figure 17:
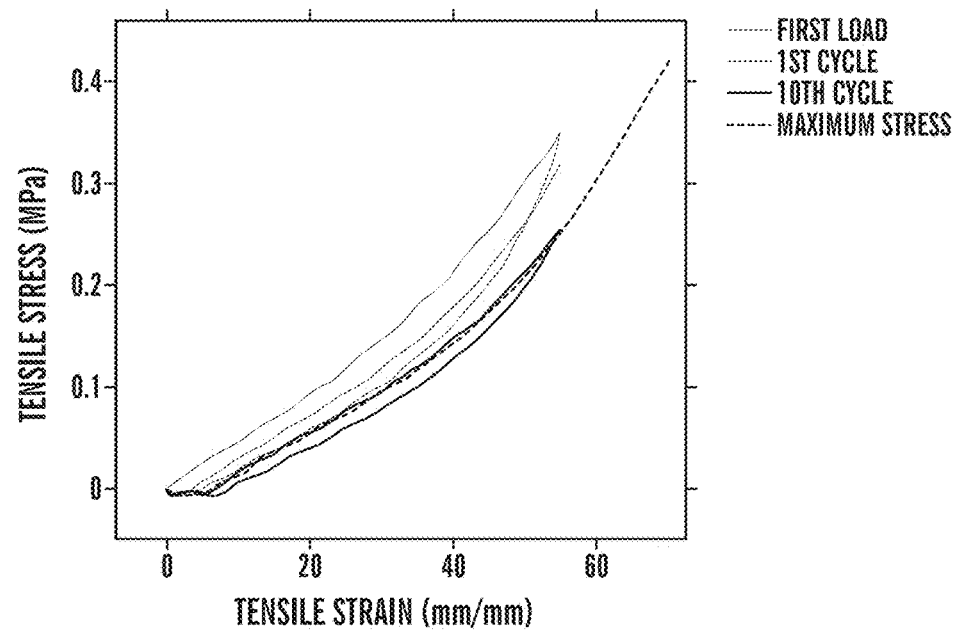
FIG. 17 is a graph showing the stress vs. % strain curves for PS-PAESO-PS #1, listed in Table 2. The first load is depicted by the blue line, which was followed by the first hysteresis cycle (black), the tenth cycle (red), and then further continued loading (gray) to find the maximum stress.
Figure 18:
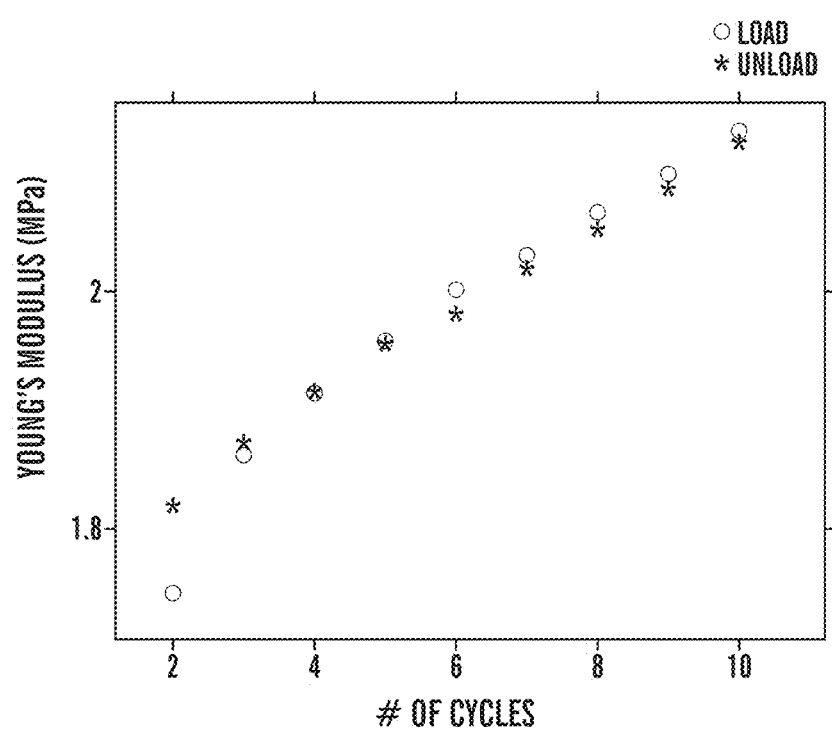
FIG. 18 is a graph showing the Young's Modulus of the PS-PAESO-PS #1, listed in Table 2, during the load and unload cycles.

Example 2—Synthesis and Characterization of PAESO, PAESO-PS, PS-PAESO, and PS-PAESO-PS Via RAFT Polymerization Materials, synthetic procedures, and characterization experimentations for PAESO, PAESO-PS, PS-PAESO, and PS-AESO-PS via RAFT polymerization have been described in Example 1. The polymers synthesized and subsequently used for characterizations are listed in Table 2. The results are shown in FIGS. 16-18.

TABLE 2

List of polymers used for characterizations

| Sample Name | M.W.[a] | PDI[b] | % Sty [c] | 1$^{st}$ [d] | 2$^{nd}$ [e] |
|---|---|---|---|---|---|
| PAESO | 29,500 | 1.39 | 0 | — | — |
| PAESO-PS | 48,150 | 1.59 | 0.39 | 18,650 | — |
| PS-PAESO | 40,980 | 1.34 | 0.33 | 13,900 | — |
| PS-PAESO-PS #1 | 53,300 | 1.84 | 0.49 | 13,900 | 12,200 |

Figure 19:
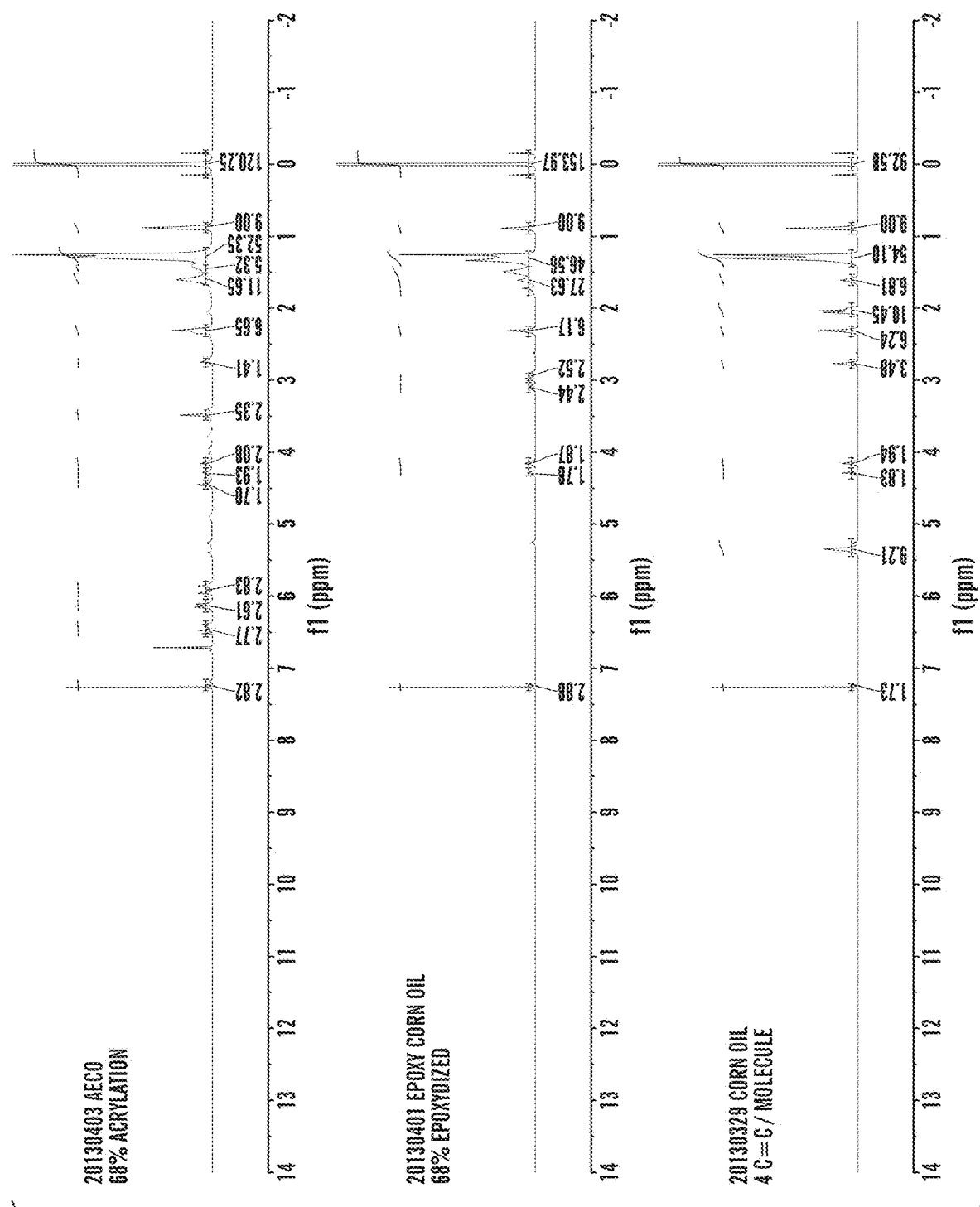
FIG. 19 is a graph comparing the $^1$H-NMR spectra of the corn oil, the epoxidized corn oil, and the acrylated epoxidized corn oil.
Figure 20:
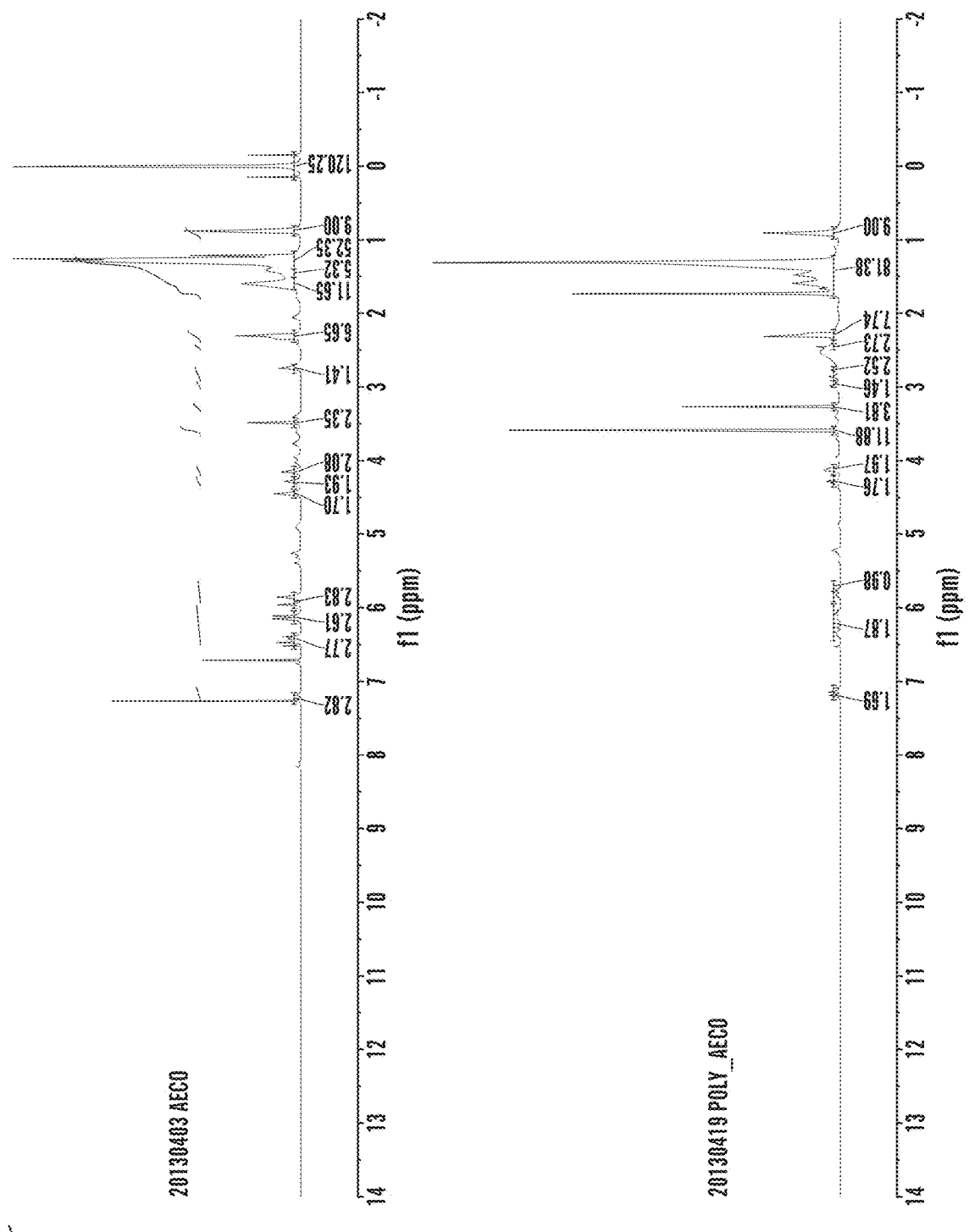
FIG. 20 is a graph comparing the $^1$H-NMR spectra of AECO monomer (top) and an AECO homopolymer with an average molecular weight of 6,512 Da after 9 hours of reaction (bottom).

[a] Total molecular weight of BCP
[b] Polydispersity
[c] Percent styrene in BCP
[d] Molecular weight of styrene in first block
[e] Molecular weight of styrene in second block Example 3—Synthesis and Characterization of Poly(Acrylated Epoxidized Corn Oil) (PAECO) Homopolymers Via RAFT Polymerization Materials, synthetic procedures, and characterization experimentations for PAECO homopolymer via RAFT polymerization are the same as those described in Example 1, except that the monomer used in the RAFT polymerization in this example is corn oil rather than soybean oil. The results are shown in FIG. 19-20.

Example 4—Synthesis and Characterization of PS-PAESO-PS and PS-PAECO-PS Triblock Copolymers Using Telechelic Chain Transfer Agent Via RAFT Polymerization Monomer (styrene), initiator, telechelic CTA, and solvent were mixed under argon in a round-bottomed flask with various mass ratios of monomer: solvent, 1:5 molar ratio of initiator to CTA, and 10:1 molar ratio of monomer to CTA. The reaction flask was bubbled with argon for 30 minutes to remove oxygen from the system before the temperature was increased. The reaction was run at 100° C. and the reaction time varied according the desired molecular weight (Mn).

For P(styrene-b-AESO-b-styrene) or P(styrene-b-AECO-b-styrene) triblock, polystyrene homopolymer was redissolved in toluene (or dioxane), AESO (or AECO), and AIBN. The reaction vessel was bubbled with argon for 1 hour and the reaction proceeded for 4-6 hours at 70° C. The final product was precipitated two times in excess methanol and water. The product was then stirred in a 2:1 volume ratio of methanol to ethanol solution for 15 minutes to remove the unreacted AESO monomer.

Figure 21:
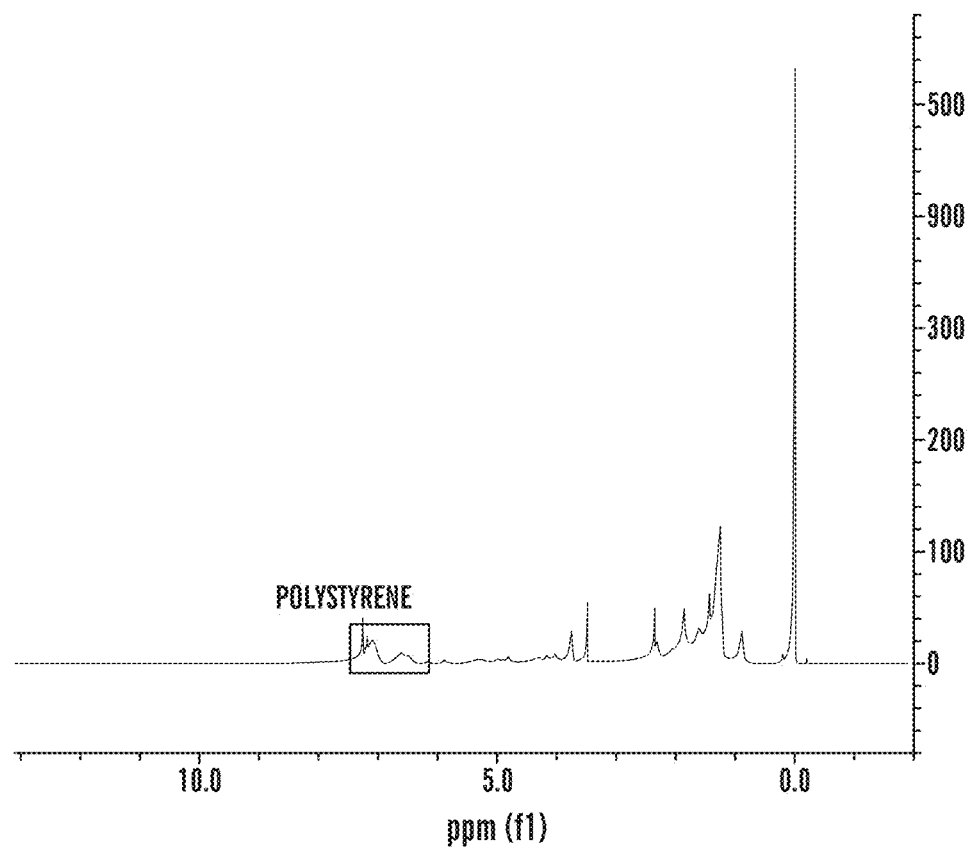
FIG. 21 is a graph showing the $^1$H-NMR spectra of the PS-PAESO-PS triblock copolymer synthesized using a telechelic CTA, having a molecular weight of 426 kDa and polydispersity of 1.26.
Figure 22:
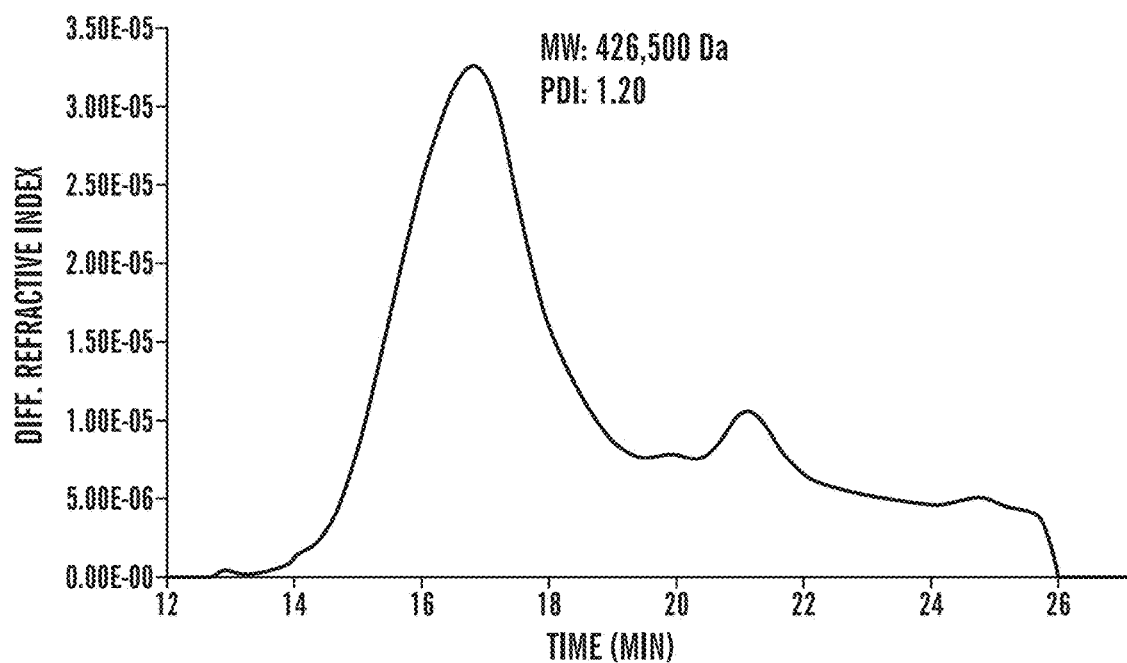
FIG. 22 is a graph showing the differential refractive index collected using gel permeation chromatography of a PAESO-containing triblock copolymer synthesized with a telechelic CTA.
Figure 23:
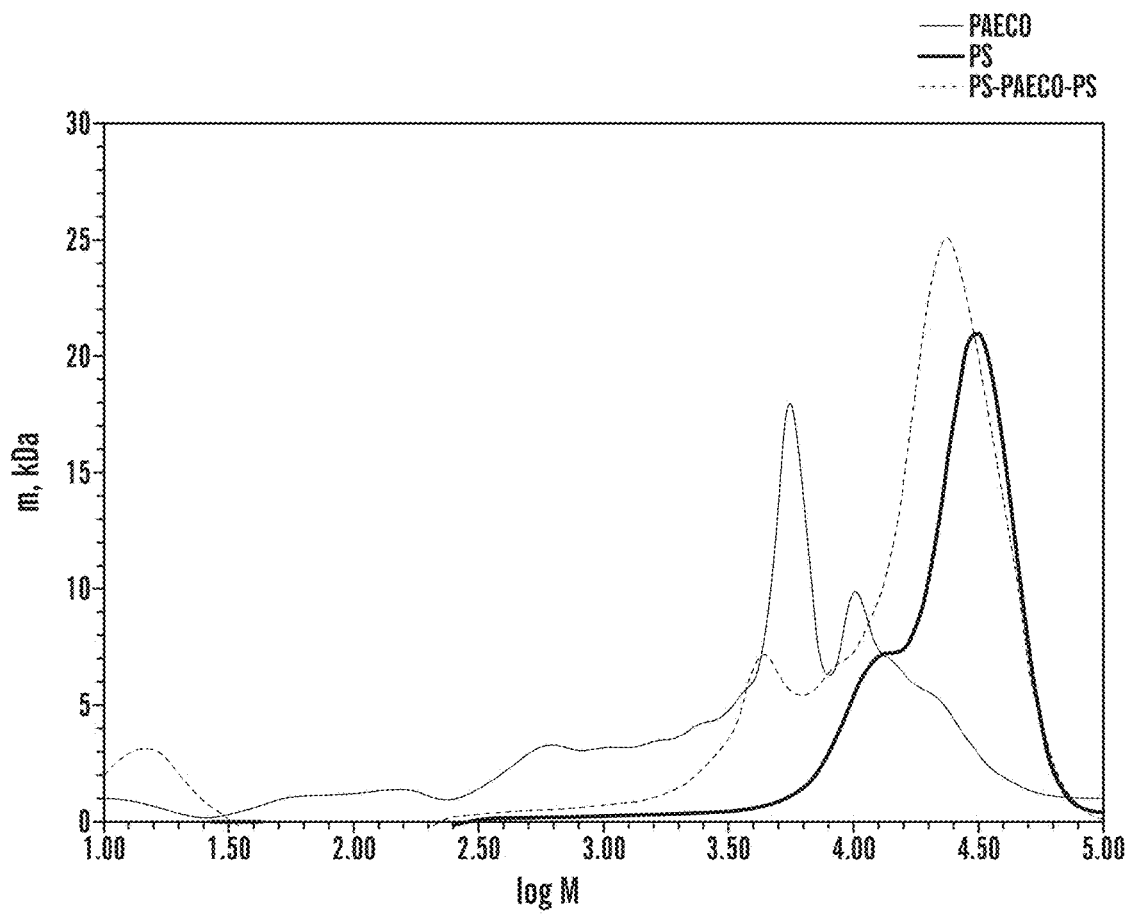
FIG. 23 is a graph showing the GPC curves for the PAECO and PS homopolymers, and a PS-PAECO-PS triblock copolymers synthesized using a telechelic CTA.

Characterization experimentations for the PS-PAESO-PS and PS-PAECO-PS block copolymer via the RAFT polymerization are otherwise the same as described in Examples 1-2. The results are shown in FIG. 21-23.

Figure 24:
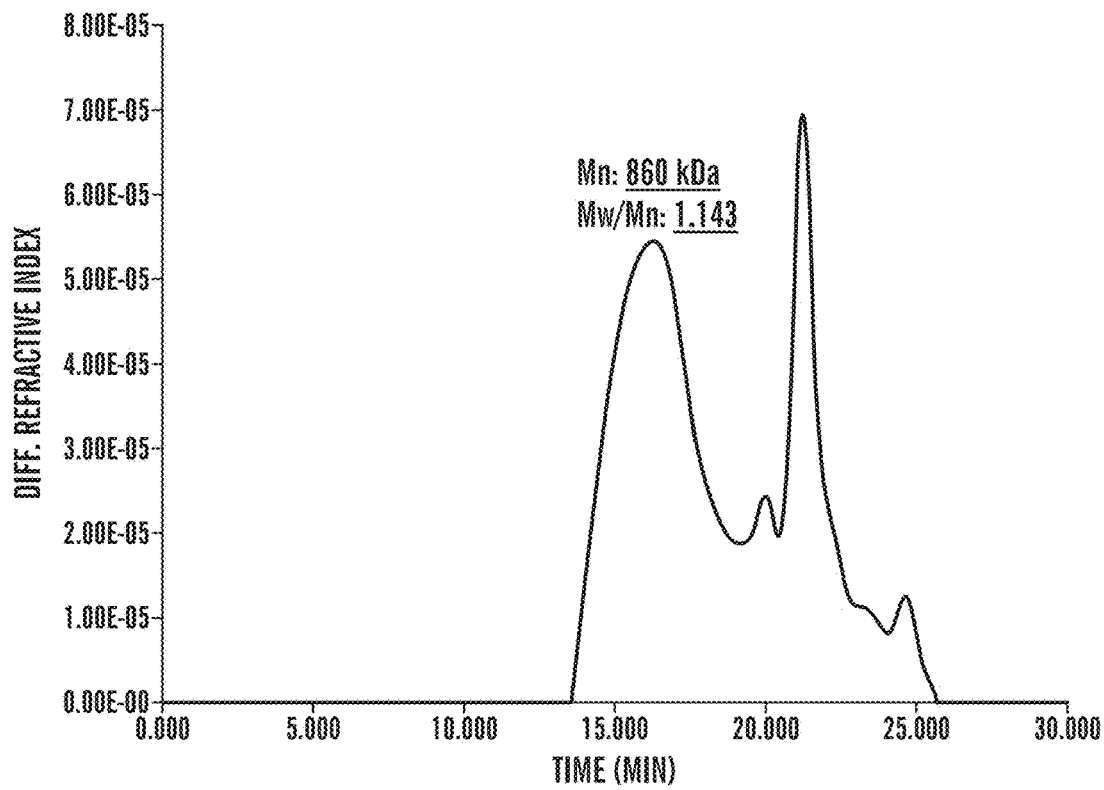
FIG. 24 is a graph showing the differential refractive index collected using gel permeation chromatography of an AESO-containing statistical copolymer.
Figure 25:
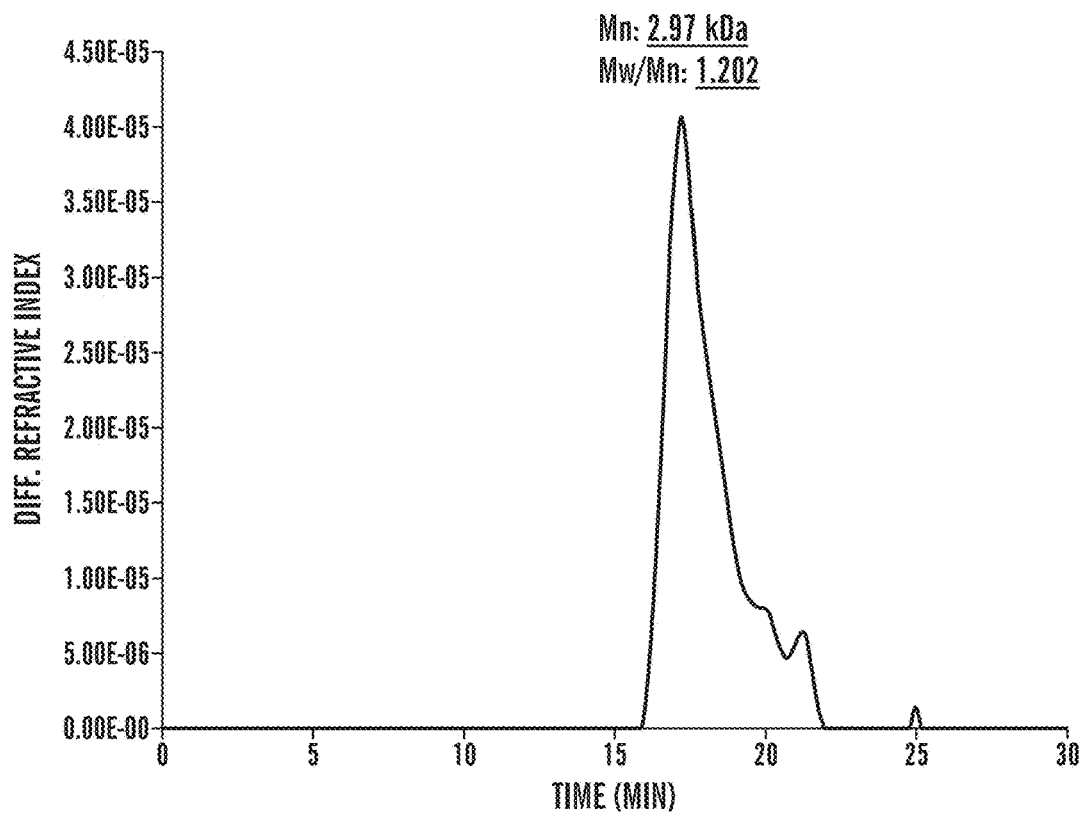
FIG. 25 is a graph showing the differential refractive index collected using gel permeation chromatography of an acrylated epoxidized corn oil (AECO)-containing statistical copolymer.

Example 5—Synthesis and Characterization of Statistical Copolymer from AESO Monomer or AECO Monomer Via RAFT Polymerization Materials and characterization experimentations for the RAFT polymerization have been described in Examples 1 and 3. The synthetic procedures and the RAFT agents are otherwise the same as those described in Examples 1 and 3, except that a statistical copolymer was synthesized by simultaneous polymerization of the styrene monomer and the AESO/AECO monomer via RAFT polymerization. The results are shown in FIG. 24-25.

Example 6—Post-Polymerization Modification of P(Styrene-b-AESO-b-Styrene)

After the different p(styrene-b-AESO-b-Styrene) triblocks were synthetized, the polymers were redissolved in solvent, and $Cu_{II}Cl_2$ was added (0.1% by mass of $Cu_{II}Cl_2$ to polymer to) to the solution. This procedure changed the polymer chain ends from a CTA functional group-terminated group to a halogen-terminated group, which further improves its chemical interactions when the polymers are mixed with an asphalt or other additives: $P.+XS\ Cu_{II}Cl_2 \rightarrow PCl+Cu_ICl$.

Example 7—Asphalt Modification with Biopolymers Derived from RAFT Polymerization of Soybean Oil Kraton® D1101, an SBS polymer, is commonly blended with liquid asphalt, at two to five percent polymer by weight of asphalt, to enhance the properties of asphalt pavements. Modifying asphalt with Kraton® increases its stiffness and elasticity at high temperatures which improves an asphalt pavement's resistance to rutting caused by traffic loading at high temperatures. A material that stiffens asphalt at high temperatures would typically stiffen asphalt at low temperatures, thereby, increasing an asphalt pavement's susceptibility to low temperature cracking. However, due to the rubbery properties of Kraton®, modifying asphalt with Kraton® does not generally affect the cracking susceptibility of asphalt at low temperatures. Therefore, Kraton® essentially widens the temperature range in which an asphalt pavement will adequately perform.

Paving grade liquid asphalt is most commonly bought and sold in the United States using the Performance Grade (PG) specification. PG specifications grade liquid asphalt with two numbers, a high temperature grade and a low temperature grade. These grades correspond to the temperature in degrees Celsius that the asphalt will adequately perform in a pavement. An example grade is a PG 64-22. The first number, 64, is the high temperature grade. This means the asphalt possesses adequate physical properties up to at least 64° C. The higher the high temperature PG of liquid asphalt is, the greater resistance it will have to rutting in an asphalt pavement. The second number, −22, is the low temperature grade and means the asphalt possesses low enough creep stiffness properties to resist low temperature shrinkage cracking at −22 degrees Celsius. The lower the low temperature PG of liquid asphalt is, the greater resistance it will have to low temperature cracking.

The low temperature PG subtracted from the high temperature PG is the working temperature range an asphalt will perform at. A PG 64-22, for example, has a working temperature range of 86 degrees Celsius. Typically, liquid asphalt producers are limited to producing unmodified asphalt with a working temperature range of up to 92 degrees Celsius. Producers need to modify asphalt with a polymer to produce an asphalt with a working range larger than 92.

The table below summarizes the PG test results that compared an asphalt blended with Kraton® D1101 (commercial SBS polymer) to the same asphalt but blended with PS-PAESO-PS biopolymer

| SBS (Kraton ®) blended with unmodified asphalt | S-PAESO-S blended with unmodified asphalt |
| --- | --- |
| Blended 3% Kraton ®D1101 to liquid asphalt with a high temperature PG of 51.3 degrees Celsius increased its high temperature PG to 61.4 degrees Celsius. | Blended 3% S-PAESO-S to liquid asphalt with a high temperature PG of 51.3 degrees Celsius increased its high temperature PG to 62.1 degrees Celsius. |
| Blended 3% Kraton ®D1101 to liquid asphalt with a low temperature PG of −36.3 degrees Celsius changed its low temperature PG to −34.1 degrees Celsius. | Blended 3% S-PAESO-S to liquid asphalt with a low temperature PG of −36.3 degrees Celsius changed its low temperature PG to −33.1 degrees Celsius. |
| Blended 3% Kraton ®D1101 to liquid asphalt increased its PG temperature range from 87.6 to 95.5 degrees Celsius. | Blended 3% S-PAESO-S to liquid asphalt increased its PG temperature range from 87.6 to 95.2 degrees Celsius. |

Although preferred embodiments have been depicted and described in detail herein, it will be apparent to those skilled in the relevant art that various modifications, additions, substitutions, and the like can be made without departing from the spirit of the present invention and these are therefore considered to be within the scope of the present invention as defined in the claims which follow.

What is claimed:

1. A thermoplastic homopolymer formed from a plurality of radically polymerizable triglyceride monomers in the form of a plant oil, animal oil, or synthetic triglycerides, said thermoplastic homopolymer being linked to a chain transfer agent.

2. The thermoplastic homopolymer of claim 1, wherein the polymerized triglyceride comprises one or more conjugated sites.

3. The thermoplastic homopolymer of claim 2, wherein the conjugated site is formed by acrylate groups.

4. The thermoplastic homopolymer of claim 2, wherein the triglyceride is acrylated epoxidized triglyceride.

5. The thermoplastic homopolymer of claim 2, wherein the triglyceride is:

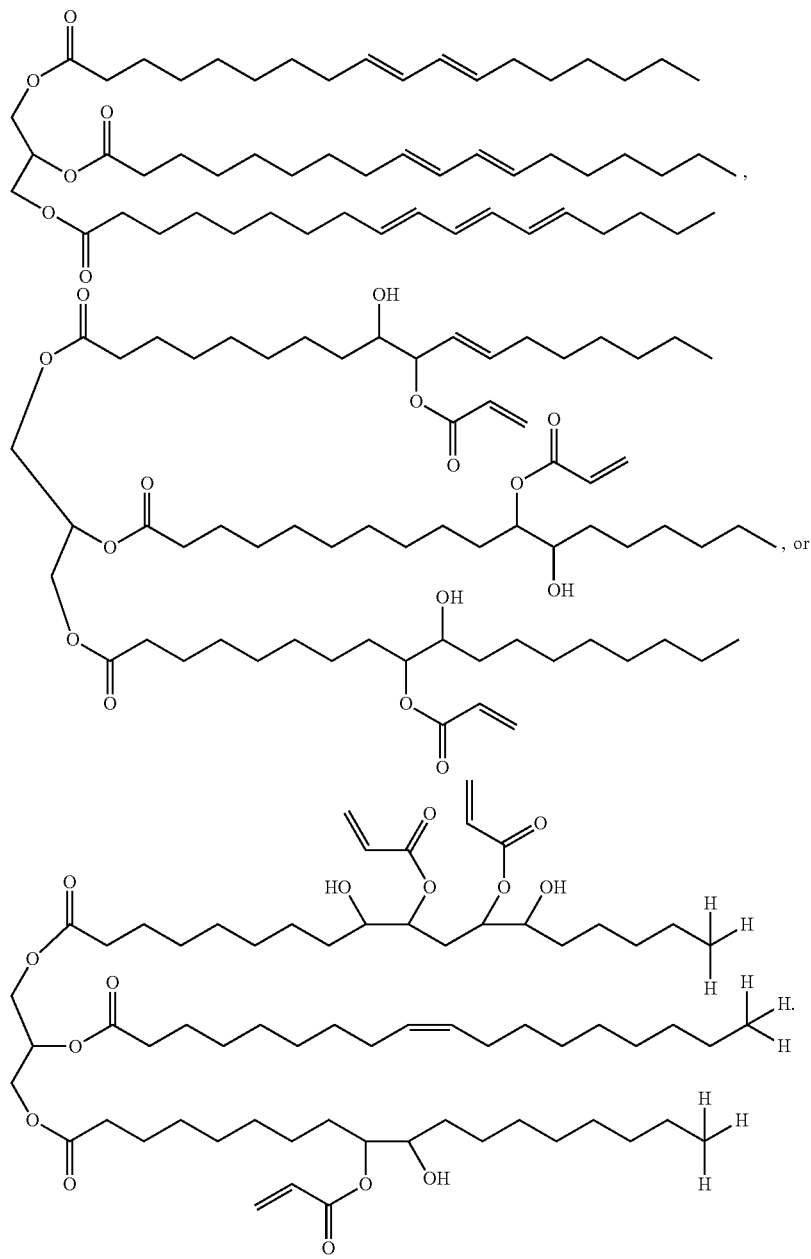

6. The thermoplastic homopolymer of claim 1, wherein the polymerized plant oil or animal oil is subsequently partially or fully saturated.

7. The thermoplastic homopolymer of claim 1, wherein the polymer is a branched-chain polymerized vegetable oil or radicals thereof.

8. The thermoplastic homopolymer of claim 7, wherein the polymer comprises a radically polymerizable plant oil monomer selected from the group consisting of soybean oil, linseed oil, corn oil, flax seed oil, and rapeseed oil.

9. The thermoplastic homopolymer of claim 7, wherein the vegetable oil is acrylated epoxidized vegetable oil, wherein the vegetable oil is soybean oil, linseed oil, corn oil, flax seed oil, or rapeseed oil.

10. The thermoplastic homopolymer of claim 7, wherein the thermoplastic homopolymer has a glass transition temperature ($T_g$) below −15° C.

11. The thermoplastic homopolymer of claim 10, wherein the thermoplastic homopolymer has a glass transition temperature ($T_g$) ranging from −60° C. to −28° C.

12. The thermoplastic homopolymer of claim 1 comprising a polymerized linear-chain or branched-chain plant oil or animal oil, or radicals thereof.

13. A telechelic thermoplastic homopolymer formed from a plurality of radically polymerizable triglyceride monomers, in the form of a plant oil, animal oil, or synthetic triglycerides, said thermoplastic homopolymer being linked to a telechelic chain transfer agent.

14. A thermoplastic homopolymer produced by a method comprising:
providing a radically polymerizable triglyceride, in the form of a plant oil, animal oil, or synthetic triglyceride monomer; and polymerizing said plant oil monomer, animal oil or synthetic triglyceride monomer via reversible addition-fragmentation chain-transfer polymerization (RAFT), in the presence of a free radical initiator and a chain transfer agent, to form the thermoplastic homopolymer, wherein said polymerizing is carried out under conditions effective to achieve a number average degree of polymerization (N) for the thermoplastic homopolymer of up to 100,000 without gelation.

15. The thermoplastic homopolymer of claim 14, wherein the chain transfer agent to the monomer molar ratio ranges from 1:1 to 50:1.

16. The thermoplastic homopolymer of claim 14, wherein the method further comprises:
catalytically hydrogenating reactive unsaturated sites in the thermoplastic homopolymer to partial or full saturation after said polymerizing.

17. The thermoplastic homopolymer of claim 14, wherein the monomer is a radically polymerizable plant oil monomer selected from the group consisting of soybean oil, linseed oil, corn oil, flax seed oil, and rapeseed oil.

18. The thermoplastic homopolymer of claim 14, wherein the triglyceride comprises one or more conjugated sites.

19. The thermoplastic homopolymer of claim 14, wherein the triglyceride is an acrylated epoxidized triglyceride.

20. The thermoplastic homopolymer of claim 14, wherein said polymerizing is carried out at a temperature of 0 to 150° C.

21. The thermoplastic homopolymer of claim 14, wherein said polymerizing is carried out in a solvent at a temperature of 50 to 85° C.

22. The thermoplastic homopolymer of claim 14, wherein said polymerizing is carried out in a solvent with the solvent being toluene, THF, chloroform, cyclohexane, dioxane, dimethyl sulfoxide, dimethyl formamide, acetone, acetonitrile, n-butanol, n-pentanol, chlorobenzene, dichloromethane, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, or a mixture thereof.

23. The thermoplastic homopolymer of claim 14, wherein said polymerizing is carried out in a solvent with the monomer having a concentration, when dissolved in the solvent, ranging from 5% to 100 wt %.

24. The thermoplastic homopolymer of claim 14, wherein said polymerizing is carried out in a solvent with the monomer having a concentration, when dissolved in the solvent, ranging from 10% to 40 wt %.

25. The thermoplastic homopolymer of claim 14, wherein the initiator is benzoyl peroxide or azobisisobutyronitrile.

26. The thermoplastic homopolymer of claim 14, wherein the chain transfer agent is a thiocarbonylthio compound, a dithioester compound, a trithiocarbonate compound, a dithiocarbamate compound, or a xanthate compound capable of reversible association with polymerizable free radicals.

27. The thermoplastic homopolymer of claim 26, wherein the chain transfer agent is 1-phenylethyl benzodithioate, 1-phenylethyl 2-phenylpropanedithioate, or dibenzyl carbonotrithioate.

* * * * *

UNITED STATES PATENT AND TRADEMARK OFFICE
CERTIFICATE OF CORRECTION

PATENT NO. : 10,752,711 B2
APPLICATION NO. : 16/020818
DATED : August 25, 2020
INVENTOR(S) : Cochran et al.

Page 1 of 1

It is certified that error appears in the above-identified patent and that said Letters Patent is hereby corrected as shown below:

In Claim 14, Column 39, Line 8, delete "(N)" and insert --(Nn)--.

Signed and Sealed this
Fifth Day of January, 2021

Andrei Iancu
*Director of the United States Patent and Trademark Office*